US012766834B2

(12) United States Patent
Gejima

(10) Patent No.: US 12,766,834 B2
(45) Date of Patent: Oct. 20, 2026

(54) LIQUID EJECTION HEAD AND RECORDING DEVICE

(71) Applicant: KYOCERA Corporation, Kyoto (JP)

(72) Inventor: Kenko Gejima, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 131 days.

(21) Appl. No.: 18/890,329

(22) Filed: Sep. 19, 2024

(65) Prior Publication Data

US 2025/0010610 A1 Jan. 9, 2025

Related U.S. Application Data

(63) Continuation of application No. 18/368,343, filed on Sep. 14, 2023, now Pat. No. 12,122,158, which is a
(Continued)

(30) Foreign Application Priority Data

May 27, 2015 (JP) ................................ 2015-107616

(51) Int. Cl.
*B41J 2/045* (2006.01)
*B41J 2/14* (2006.01)

(52) U.S. Cl.
CPC ....... *B41J 2/14201* (2013.01); *B41J 2/04501* (2013.01); *B41J 2/14* (2013.01);
(Continued)

(58) Field of Classification Search
CPC ...... B41J 2/04501; B41J 2/14; B41J 2/14024; B41J 2/14201; B41J 2/14209;
(Continued)

(56) References Cited

U.S. PATENT DOCUMENTS 6,910,759 B2 6/2005 Kawamura et al.
6,981,760 B2 1/2006 Yamamoto
(Continued)

FOREIGN PATENT DOCUMENTS

CN 106660365 A 5/2017
JP 2000-211125 A 8/2000
(Continued)

OTHER PUBLICATIONS

International Search Report, PCT/JP2016/065706, Aug. 9, 2016, 1 pg.
(Continued)

*Primary Examiner* — Anh T Vo
(74) *Attorney, Agent, or Firm* — Volpe Koenig

(57) ABSTRACT

A liquid ejection head in the present disclosure includes a first channel member and a second channel member. The first channel member includes a first surface, a plurality of ejection ports in the first surface, a second surface on the opposite side to the first surface, a third channel, a plurality of pressurizing in communication with the third channel and with the plurality of ejection ports respectively, and a fourth channel. The second channel member is on the second surface and includes a first channel in communication with the third channel and configured using resin and a second channel in communication with the third channel through the forth channel.

16 Claims, 11 Drawing Sheets

Related U.S. Application Data continuation of application No. 17/739,881, filed on May 9, 2022, now Pat. No. 11,787,178, which is a continuation of application No. 17/000,137, filed on Aug. 21, 2020, now Pat. No. 11,351,780, which is a continuation of application No. 16/392,210, filed on Apr. 23, 2019, now Pat. No. 10,751,995, which is a continuation of application No. 15/576,990, filed as application No. PCT/JP2016/065706 on May 27, 2016, now Pat. No. 10,293,608.

(52) U.S. Cl.
CPC ....... *B41J 2/14024* (2013.01); *B41J 2/14233* (2013.01); *B41J 2002/14322* (2013.01); *B41J 2002/14362* (2013.01); *B41J 2002/14419* (2013.01); *B41J 2002/14491* (2013.01); *B41J 2202/12* (2013.01)

(58) Field of Classification Search
CPC .......... B41J 2/14233; B41J 2002/14225; B41J 2002/14322; B41J 2002/14362; B41J 2002/14419; B41J 2002/14459; B41J 2002/14491; B41J 2022/12; B41J 2022/20; B41J 2022/21
See application file for complete search history.

(56) References Cited

U.S. PATENT DOCUMENTS

| | | | |
|---|---|---|---|
| 7,267,432 B2 | 9/2007 | Hibi | |
| 8,276,250 B2 | 10/2012 | Wijngaards et al. | |
| 8,398,214 B2 | 3/2013 | Okubo | |
| 8,794,734 B2 | 8/2014 | Owaki | |
| 9,150,019 B2 | 10/2015 | Takeuchi et al. | |
| 9,333,746 B2 | 5/2016 | Nagamochi et al. | |
| 9,744,760 B2 | 8/2017 | Yamada et al. | |
| 10,293,608 B2 | 5/2019 | Gejima | |
| 10,315,447 B2 | 6/2019 | Gejima | |
| 2004/0257393 A1 | 12/2004 | Merz | |
| 2007/0052764 A1 | 3/2007 | Oku et al. | |
| 2007/0091150 A1 | 4/2007 | Kodama | |
| 2008/0049075 A1* | 2/2008 | Ito | B41J 2/14209 347/65 |
| 2010/0309244 A1 | 12/2010 | Yamada | |
| 2011/0085012 A1 | 4/2011 | Nishikawa et al. | |
| 2011/0228011 A1 | 9/2011 | Kyoso | |
| 2012/0160925 A1 | 6/2012 | Hoisington et al. | |
| 2012/0176450 A1 | 7/2012 | Akahane et al. | |
| 2012/0242739 A1* | 9/2012 | Owaki | B41J 2/04563 347/17 |
| 2013/0050338 A1* | 2/2013 | Shimosato | B41J 2/14209 29/890.1 |
| 2013/0076834 A1 | 3/2013 | Nosaka et al. | |
| 2013/0076838 A1 | 3/2013 | Suzuki et al. | |
| 2013/0120504 A1 | 5/2013 | Yanata et al. | |
| 2013/0162725 A1 | 6/2013 | Suzuki | |
| 2014/0104348 A1 | 4/2014 | Owaki | |
| 2014/0292909 A1 | 10/2014 | Watanabe et al. | |
| 2015/0042723 A1 | 2/2015 | Fukuda | |
| 2015/0077490 A1 | 3/2015 | Miyasaka | |
| 2015/0283808 A1 | 10/2015 | Shimosato et al. | |
| 2016/0185113 A1 | 6/2016 | Yoshida et al. | |
| 2017/0151792 A1 | 6/2017 | Kobayashi et al. | |

FOREIGN PATENT DOCUMENTS

| | | |
|---|---|---|
| JP | 2001-232788 A | 8/2001 |
| JP | 2002-079682 A | 3/2002 |
| JP | 2004-209655 A | 7/2004 |
| JP | 2004-291484 A | 10/2004 |
| JP | 2005-186293 A | 7/2005 |
| JP | 2010-012650 A | 1/2010 |
| JP | 2010-201937 A | 9/2010 |
| JP | 2011-079251 A | 4/2011 |
| JP | 2012-011629 A | 1/2012 |
| JP | 2012061717 A | 3/2012 |
| JP | 2012-143948 A | 8/2012 |
| JP | 2013-067145 A | 4/2013 |
| JP | 2013-180405 A | 9/2013 |
| JP | 2014-028452 A | 2/2014 |
| JP | 2014-046627 A | 3/2014 |
| JP | 2014-104714 A | 6/2014 |
| JP | 2014-144561 A | 8/2014 |
| JP | 2014-162076 A | 9/2014 |
| JP | 2014-162192 A | 9/2014 |
| JP | 2014-223801 A | 12/2014 |
| JP | 2014-237323 A | 12/2014 |
| JP | 2016-124191 A | 7/2016 |

OTHER PUBLICATIONS

International Search Report, PCT/JP2015/085781, Mar. 15, 2016, 2 pages.
Japanese Office Action, Japanese Patent Application No. 2016-566376, filed Feb. 13, 2018, 3 pages.
Extended European Search Report. European Patent Application No. 16800117.1, dated Mar. 16, 2018, 9 pages.

* cited by examiner

LIQUID EJECTION HEAD AND RECORDING DEVICE

CROSS REFERENCE TO RELATED APPLICATIONS

This application is a continuation of U.S. patent application Ser. No. 18/368,343, filed Sep. 14, 2023, which is a continuation of U.S. patent application Ser. No. 17/739,881, filed on May 9, 2022, which issued as U.S. Pat. No. 11,787,178 on Oct. 17, 2023, which is a continuation of U.S. patent application Ser. No. 17/000,137, filed on Aug. 21, 2020, which issued as U.S. Pat. No. 11,351,780 on Jun. 7, 2022, which is a continuation of U.S. patent application Ser. No. 16/392,210, filed on Apr. 23, 2019, which issued as U.S. Pat. No. 10,751,995 on Aug. 25, 2020, which is a continuation of U.S. patent application Ser. No. 15/576,990, filed on Nov. 27, 2017, which issued U.S. Pat. No. 10,293,608 on May 21, 2019, which is a National Stage Entry of PCT/JP2016/065706, filed on May 27, 2016, which claims priority to JP Patent Application No. 2015-107616, filed on May 27, 2015, incorporated by reference herein in its entirety.

TECHNICAL FIELD

The present invention relates to a liquid ejection head and a recording device.

BACKGROUND ART

Conventionally, as a printing head, there has been known a liquid ejection head performing various types of printing by ejecting a liquid onto a recording medium. As such a liquid ejection head, there is known a head provided with a first channel member having a first surface, a plurality of ejection ports which are provided in the first surface, a plurality of pressurizing chambers which are individually communicated with the plurality of ejection ports, and a second surface which is positioned on the opposite side to the first surface; with a pressurizing member which is provided on the second surface; and with a second channel member having a third surface, a fourth surface which is positioned on the opposite side to the third surface, a raised part which protrudes from the fourth surface, and a first through hole which is provided in the raised part. Due to this, inflow of the liquid supplied to the second channel member through the first through hole to the inside is suppressed (see for example Patent Literature 1).

CITATION LIST

Patent Literature

Patent Literature 1: Japanese Patent Publication No. 2014-162192A

SUMMARY OF INVENTION

A liquid ejection head in the present disclosure is provided with a first channel member including a first surface, a plurality of ejection ports in the first surface, a plurality of pressurizing chambers which are individually communicated with the plurality of ejection ports, and a second surface on the opposite side to the first surface; with a pressurizing member on the second surface; and with a second channel member including a third surface, a fourth surface on the opposite side to the third surface, a raised part which protrudes from the fourth surface, and a first through hole in the raised part. Further, the second channel member is provided on a region in the second surface of the first channel member, in which the pressurizing member is not arranged. Further, when viewed on a plane, an outer circumference of the raised part is located on inner side from an outer circumference of the fourth surface.

A recording device in the present disclosure is provided with the liquid ejection head, a conveying part which conveys a recording medium with respect to the liquid ejection head, and a control part which controls the liquid ejection head.

BRIEF DESCRIPTION OF DRAWINGS

FIGS. 9A and 9B show a liquid ejection head according to a second embodiment, in which FIG. 9A is a perspective view of the second channel member seen from the third surface side, and FIG. 9B is a cross-sectional view showing a portion in the liquid ejection head according to the second embodiment enlarged.

DESCRIPTION OF EMBODIMENTS

First Embodiment

Figure 1A:
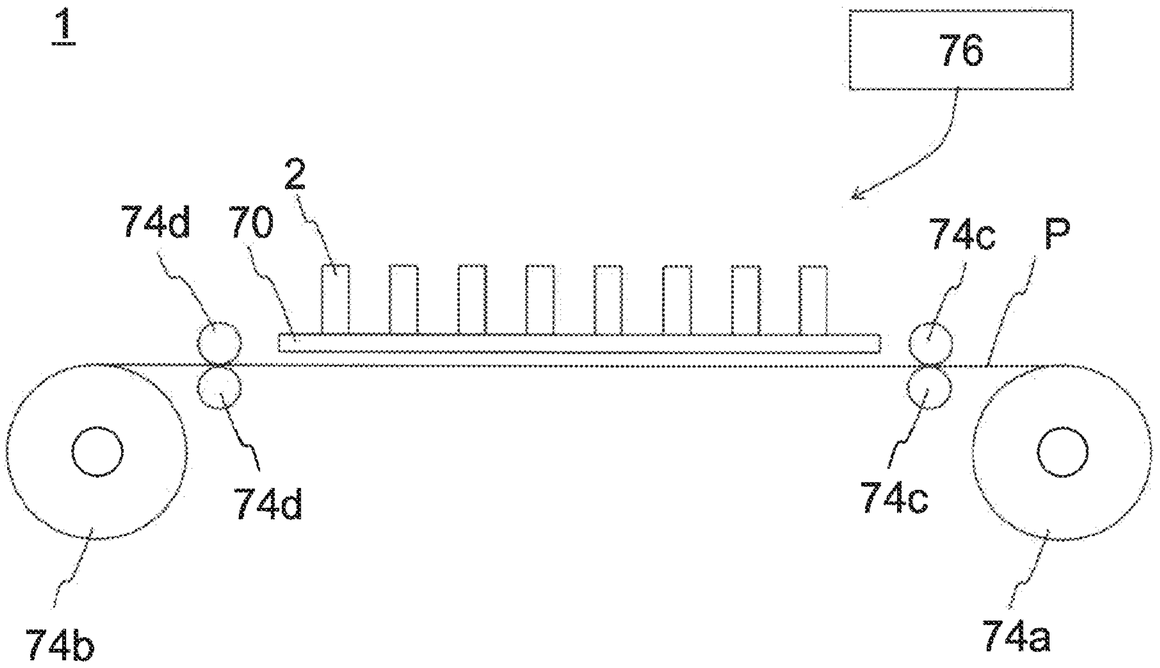
FIG. 1A is a side view schematically showing a recording device including a liquid ejection head according to a first embodiment.
Figure 1B:
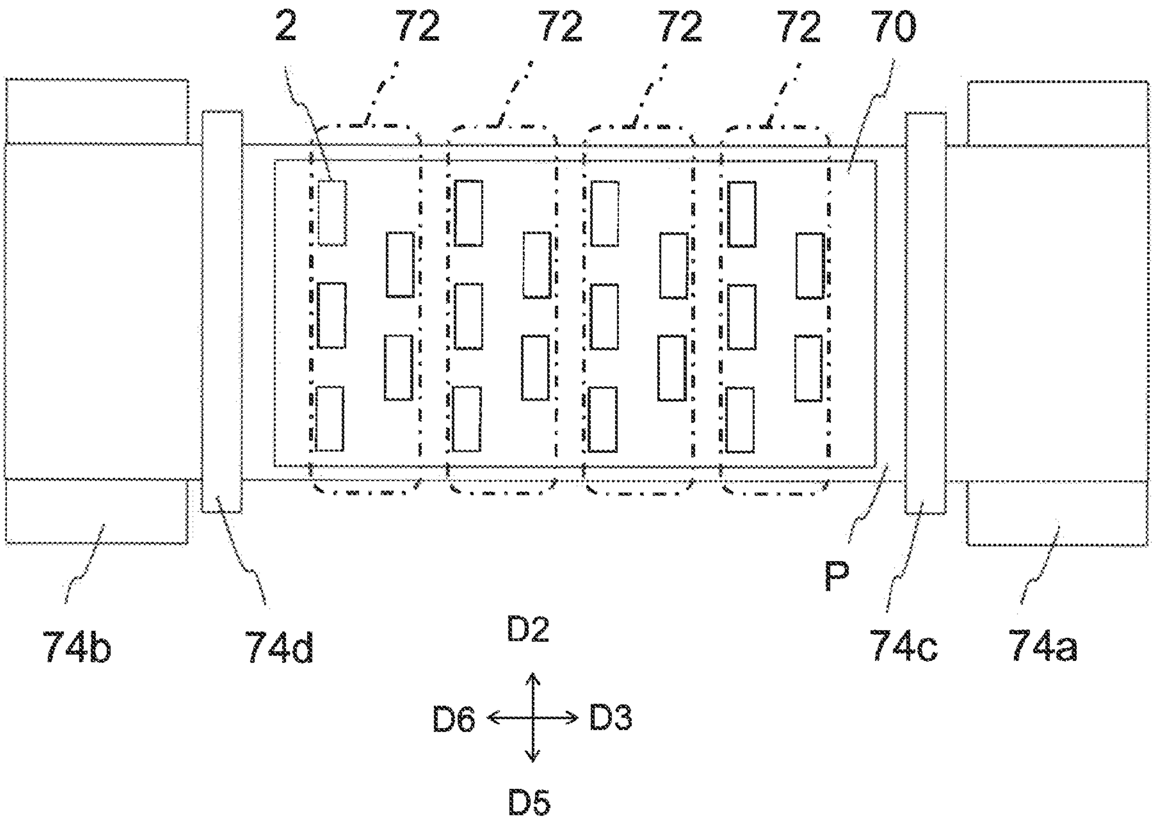
FIG. 1B is a plan view schematically showing the recording device shown in FIG. 1A.

A color inkjet printer 1 (below, referred to as a "printer 1") including a liquid ejection head 2 according to a first embodiment will be explained by using FIGS. 1A and 1B. The drawings show a first direction D1, second direction D2, third direction D3, fourth direction D4, fifth direction D5, and sixth direction D6. The first direction D1 is one side of the direction in which a first common channel 20 and second common channel 24 extend, while the fourth direction D4 is the other side of the direction in which the first common channel 20 and second common channel 24 extend. The second direction D2 is one side of the direction in which a first combined channel 22 and second combined channel 26 extend, and the fifth direction D5 is the other side of the direction in which the first combined channel 22 and second combined channel 26 extend. The third direction D3 is one side of the direction perpendicular to the direction in which the first combined channel 22 and second combined channel 26 extend, and the sixth direction D6 is the other side of the direction perpendicular to the direction in which the first combined channel 22 and second combined channel 26 extend.

The printer 1 conveys a recording medium P from a conveying roller 74*a* to a conveying roller 74*b* to thereby make a recording medium P relatively move with respect to the liquid ejection heads 2. The control part 76 controls the liquid ejection heads 2 based on image and text data to make them eject liquid toward the recording medium P to deposit droplets on the recording medium P and thereby print the recording medium P.

In the present embodiment, the liquid ejection heads 2 are fixed with respect to the printer 1, and the printer 1 becomes so-called line printer. As another embodiment of the recording device, so-called serial printer can be mentioned.

In the printer 1, a flat-shaped head mount frame 70 is fastened so as to become substantially parallel to the recording medium P. The head mount frame 70 is provided with 20 holes (not shown). Twenty liquid ejection heads 2 are mounted in the holes. Five liquid ejection heads 2 configure one head group 72, so the printer 1 has four head groups 72.

The liquid ejection head 2 forms an elongated long shape from the second direction D2 to the fifth direction D5. In one head group 72, three liquid ejection heads 2 are arranged along a line from the second direction D2 to the fifth direction D5, while the other two liquid ejection heads 2 are arranged at positions which are offset to the fifth direction D5. The adjoining liquid ejection heads 2 are arranged so that ranges which can be printed by the liquid ejection heads 2 are connected from the second direction D2 to the fifth direction D5 or overlap at the ends, therefore printing without gaps becomes possible in the width direction of the recording medium P.

The four head groups 72 are arranged from the third direction D3 to the sixth direction D6. Each liquid ejection head 2 is supplied with ink from a not shown liquid tank. The liquid ejection heads 2 belonging to one head group 72 are supplied with ink of the same color. Four colors of ink are printed by the four head groups. The colors of inks ejected from the head groups 72 are for example magenta (M), yellow (Y), cyan (C), and black (K).

Note that, the number of the liquid ejection heads 2 mounted in the printer 1 may be one as well so far as printing is carried out in a range which can be printed by one liquid ejection head 2 in a single color. The number of liquid ejection heads 2 included in the head group 72 or the number of head groups 72 can be suitably changed according to the target of printing or the printing conditions. For example, the number of head groups 72 may be increased as well in order to perform printing by still further colors. Further, by arranging a plurality of head groups 72 for printing in the same color and alternately printing in the conveying direction, the printing speed, that is, the conveying speed, can be raised. Further, the resolution in the width direction of the recording medium P may be raised by preparing a plurality of head groups 2 for printing in the same color and arranging them offset to the third direction D3 as well.

Further, other than printing colored inks, a coating agent or other liquid may be printed as well for surface treatment of the recording medium P.

The printer 1 performs printing on the recording medium P. The recording medium P has been wound around the conveying roller 74*a*. It passes between two conveying rollers 74*c*, then passes under the liquid ejection heads 2 mounted in the head mount frame 70. After that, it passes between the two conveying rollers 74*d* and is finally collected by the conveying roller 74*b*.

The recording medium P may be fabric or the like other than printing paper. Further, the printer 1 may be made a form conveying a conveying belt in place of the recording medium P, while the recording medium P may be a sheet of paper, cut fabric, wood, tile, etc. placed on the conveying belt besides a roll-shaped medium. Further, liquid containing conductive particles may be ejected from the liquid ejection heads 2 to print a wiring pattern of an electronic apparatus etc. as well. Further, predetermined amounts of liquid chemical agents or liquids containing chemical agents may be ejected from the liquid ejection heads 2 toward a reaction vessel or the like to cause a reaction and thereby prepare pharmaceutical products.

Further, a position sensor, speed sensor, temperature sensor, or the like may be attached to the printer 1, and the control part 76 may control portions in the printer 1 in accordance with the states of the portions in the printer 1 seen from the information of the sensors. In particular, when the ejection amount, ejection speed, and other ejection characteristics of the liquid ejected from a liquid ejection head 2 are influenced by the outside, a driving signal for making the liquid ejection head 2 eject liquid may be changed in accordance with the temperature of the liquid ejection head 2, temperature of the liquid in the liquid tank, or the pressure which is being applied to the liquid ejection head 2 by the liquid in the liquid tank.

Next, a liquid ejection head 2 according to the first embodiment will be explained by using FIGS. 2 to 8A and 8B. Note that, for easier understanding of the drawings, in FIGS. 5A and 5B to 7A and 7B, the channels etc. which are located under the other members and should be drawn by broken lines are drawn by solid lines.

Figure 2:
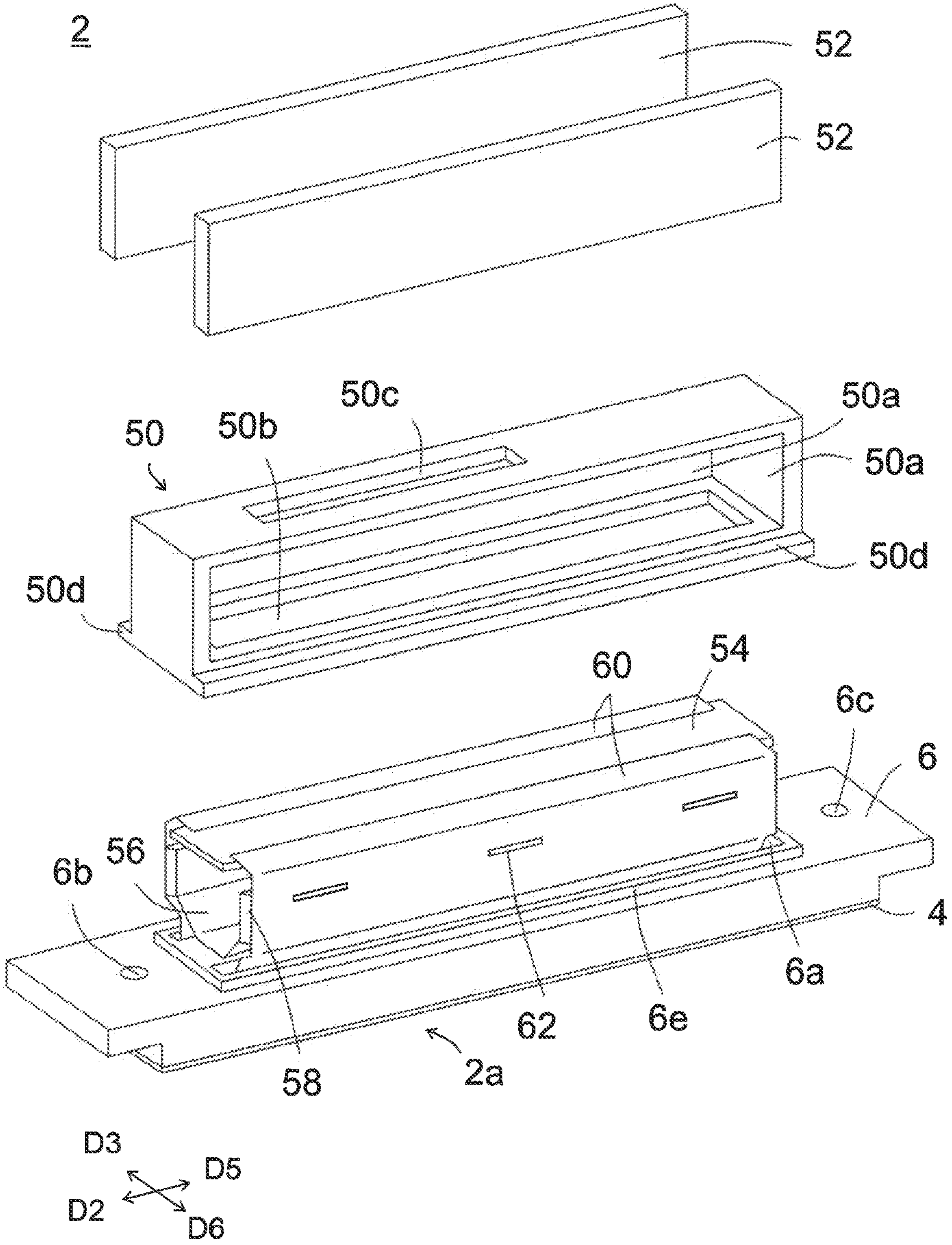
FIG. 2 is a disassembled perspective view of the liquid ejection head according to the first embodiment.
Figure 3A:
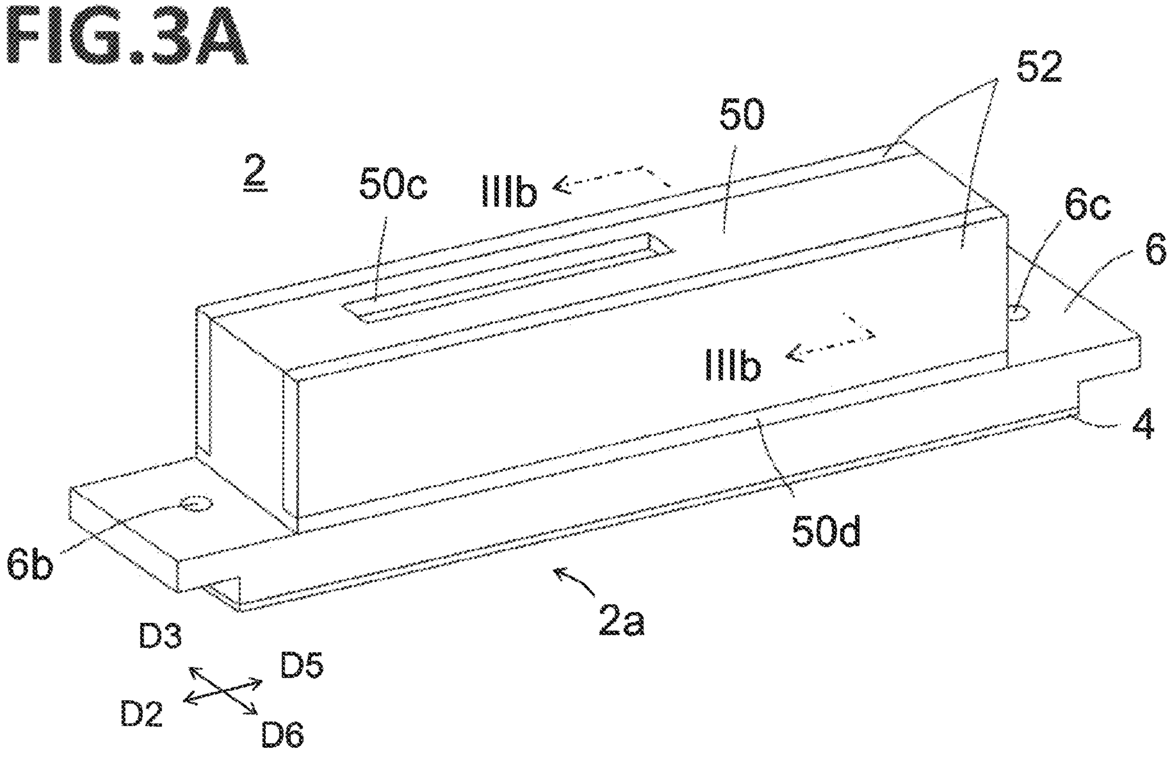
FIG. 3A is a perspective view of the liquid ejection head in FIG. 2.
Figure 3B:
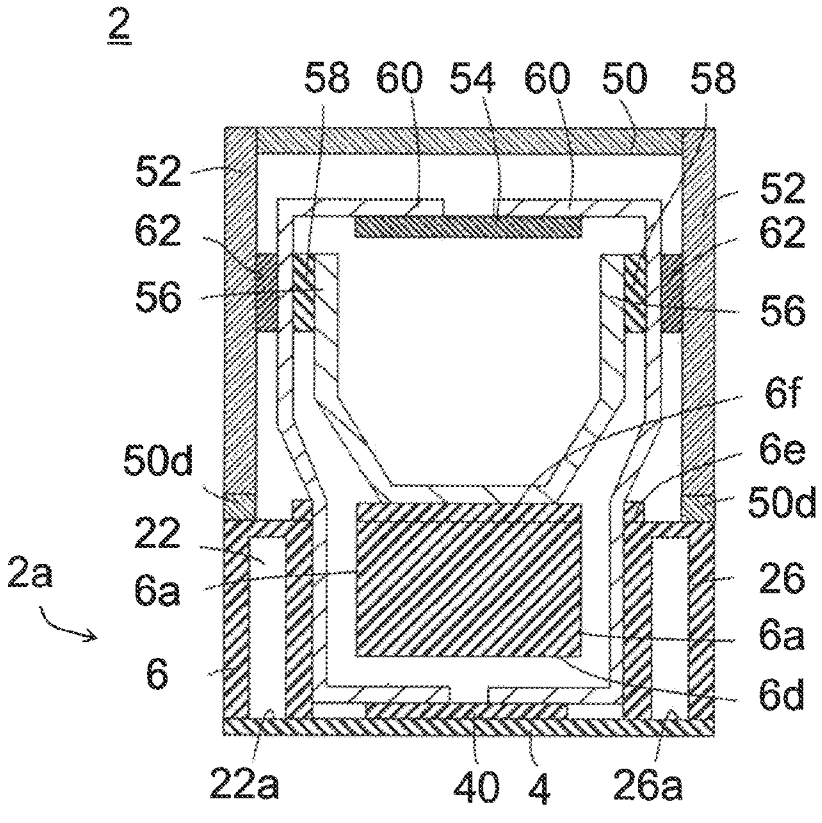
FIG. 3B is a cross-sectional view taken along the IIIb-IIIb line in FIG. 3A.

As shown in FIGS. 2 and 3A and 3B, the liquid ejection head 2 is provided with a head body 2*a*, housing 50, heat dissipation plates 52, circuit board 54, pressing member 56, elastic members 58, signal transmission members 60, and driver IC 62. Note that, the liquid ejection head 2 may be provided with just the head body 2*a* and does not always have to be provided with the housing 50, heat dissipation plates 52, circuit board 54, pressing member 56, elastic members 58, signal transmission members 60, and driver IC 62.

In the liquid ejection head 2, the signal transmission members 60 are led out from the head body 2*a*, and the signal transmission members 60 are electrically connected to the circuit board 54. The signal transmission members 60 are provided with the driver IC 62 which controls driving of the liquid ejection head 2. The driver IC 62 is pressed against the heat dissipation plates 52 by the pressing member 56 through the elastic members 58. Note that, illustration of a support member supporting the circuit board 54 is omitted.

The heat dissipation plates 52 can be formed by a metal or alloy and are provided for dissipating heat of the driver IC 62 to the outside. The heat dissipation plates 52 are joined to the housing 50 by screws or an adhesive.

The housing 50 is placed on the head body 2*a*. The members configuring the liquid ejection head 2 are covered by the housing 50 and heat dissipation plates 52. The housing 50 is provided with openings 50*a*, 50*b*, and 50*c* and heat insulation parts 50*d*.

The openings 50*a* are provided so as to face the third direction D3 and the sixth direction D6, while the heat dissipation plates 52 are arranged so as to close the openings 50*a*. The opening 50*b* is opened downward. The circuit board 54 and pressing member 56 are arranged inside the housing 50 through the opening 50*b*. The opening 50*c* is opened upward and accommodates a connector (not shown) provided on the circuit board 54.

The heat insulation parts 50*d* are provided so as to extend from the second direction D2 to the fifth direction D5. Each is arranged between the heat dissipation plate 52 and the head body 2*a*. By that, the heat dissipated to the heat dissipation plates 52 becomes hard to be transferred to the head body 2*a*. The housing 50 can be formed by a metal, alloy, or resin.

Figure 4A:
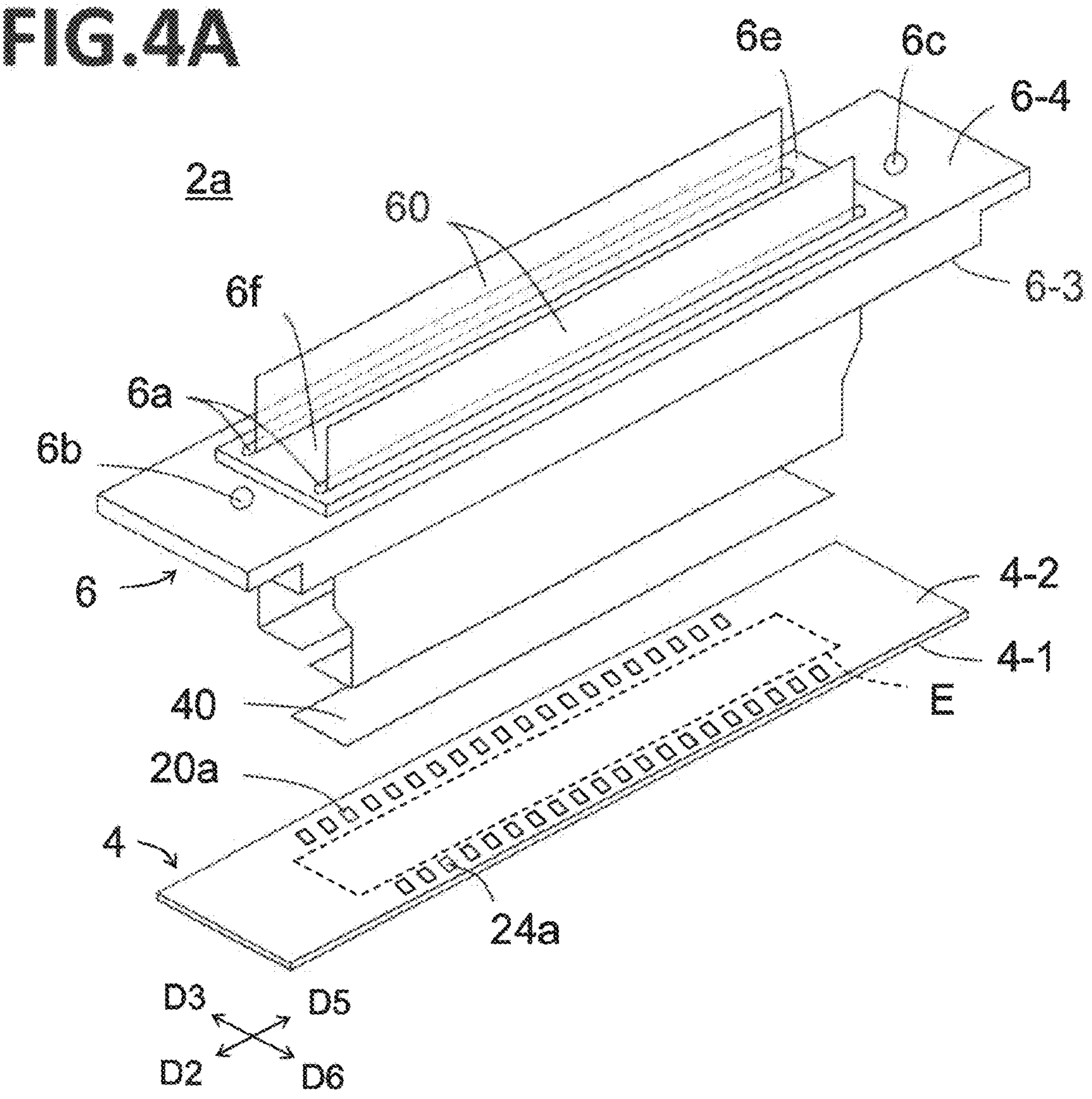
FIG. 4A is a disassembled perspective view of a head body.
Figure 4B:
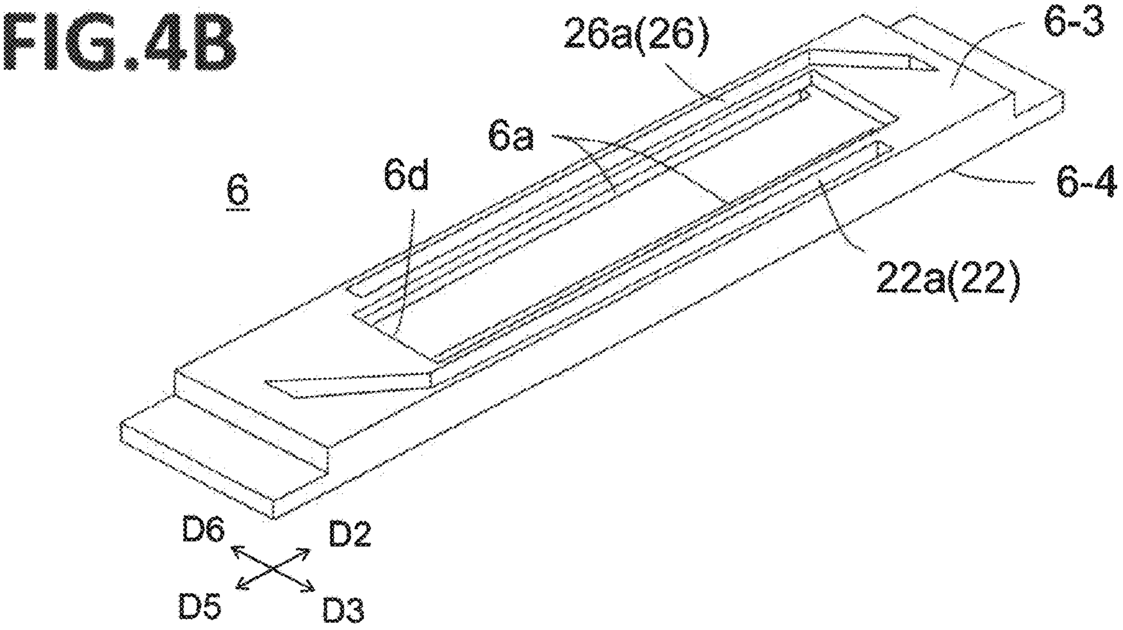
FIG. 4B is a perspective view of a second channel member seen from the third surface side.
Figure 5A:
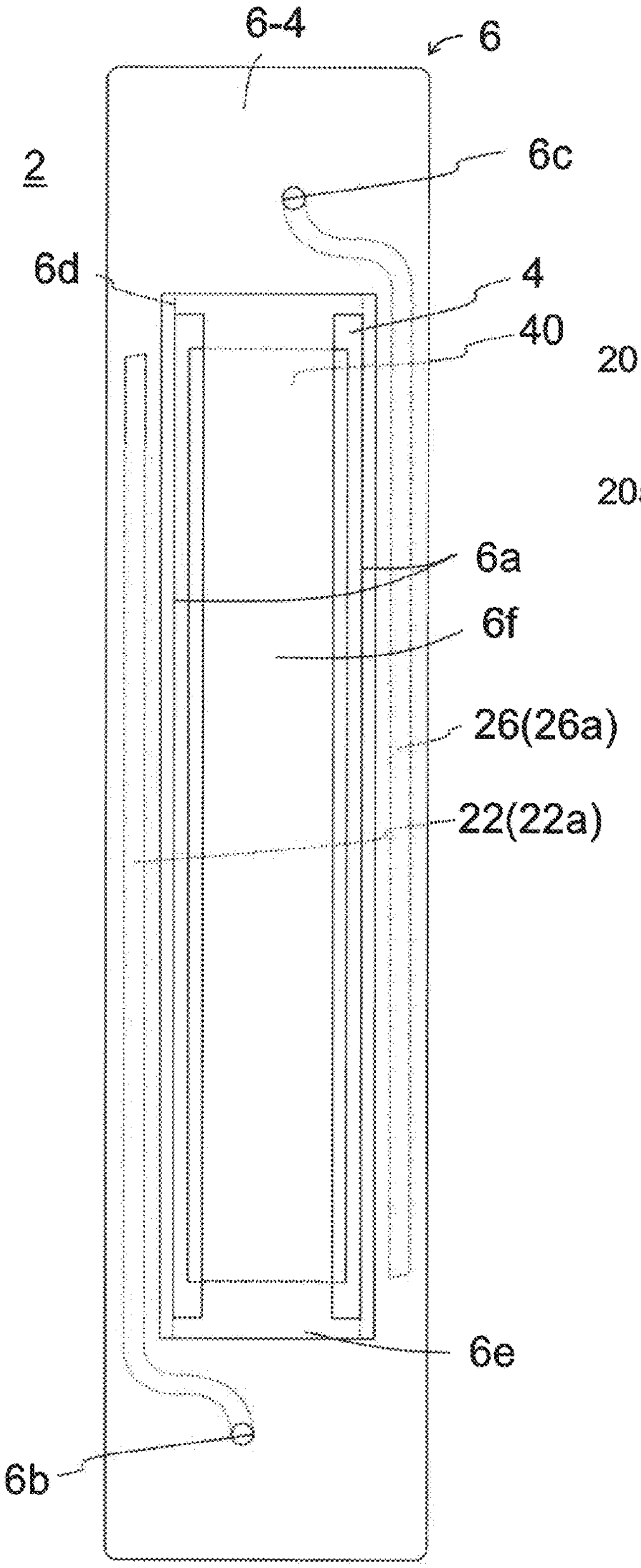
FIG. 5A is a plan view of the second channel member and actuator substrate.
Figure 5B:
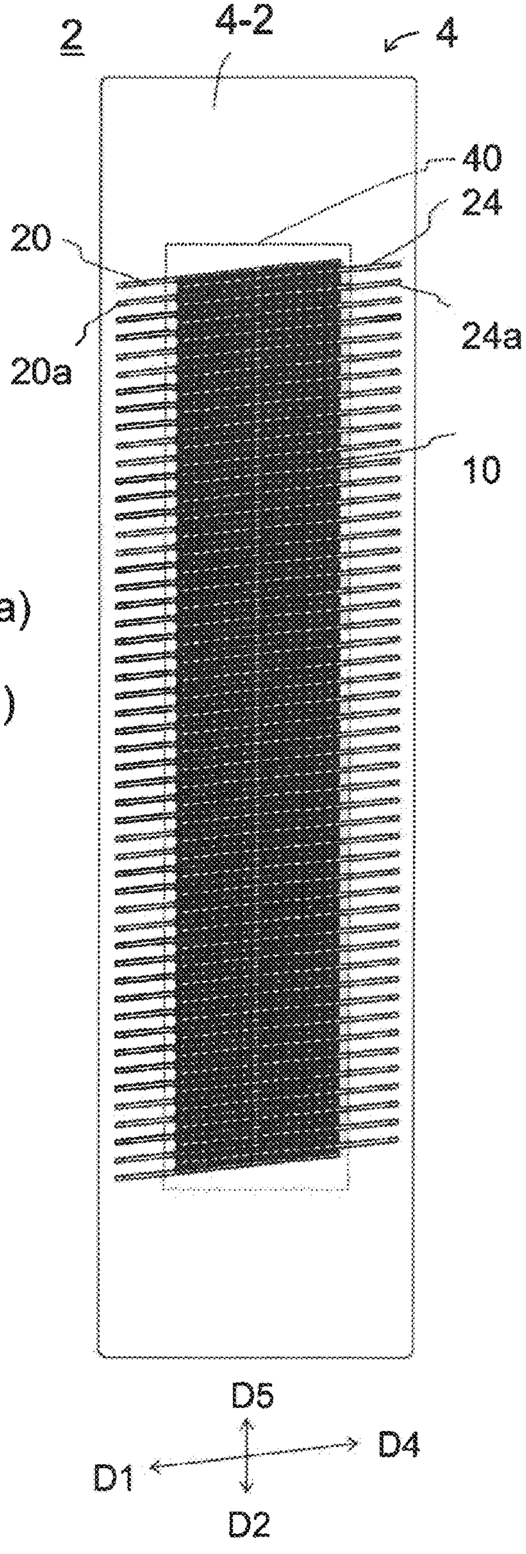
FIG. 5B is a bottom view of the first channel member and actuator substrate.
Figure 6:
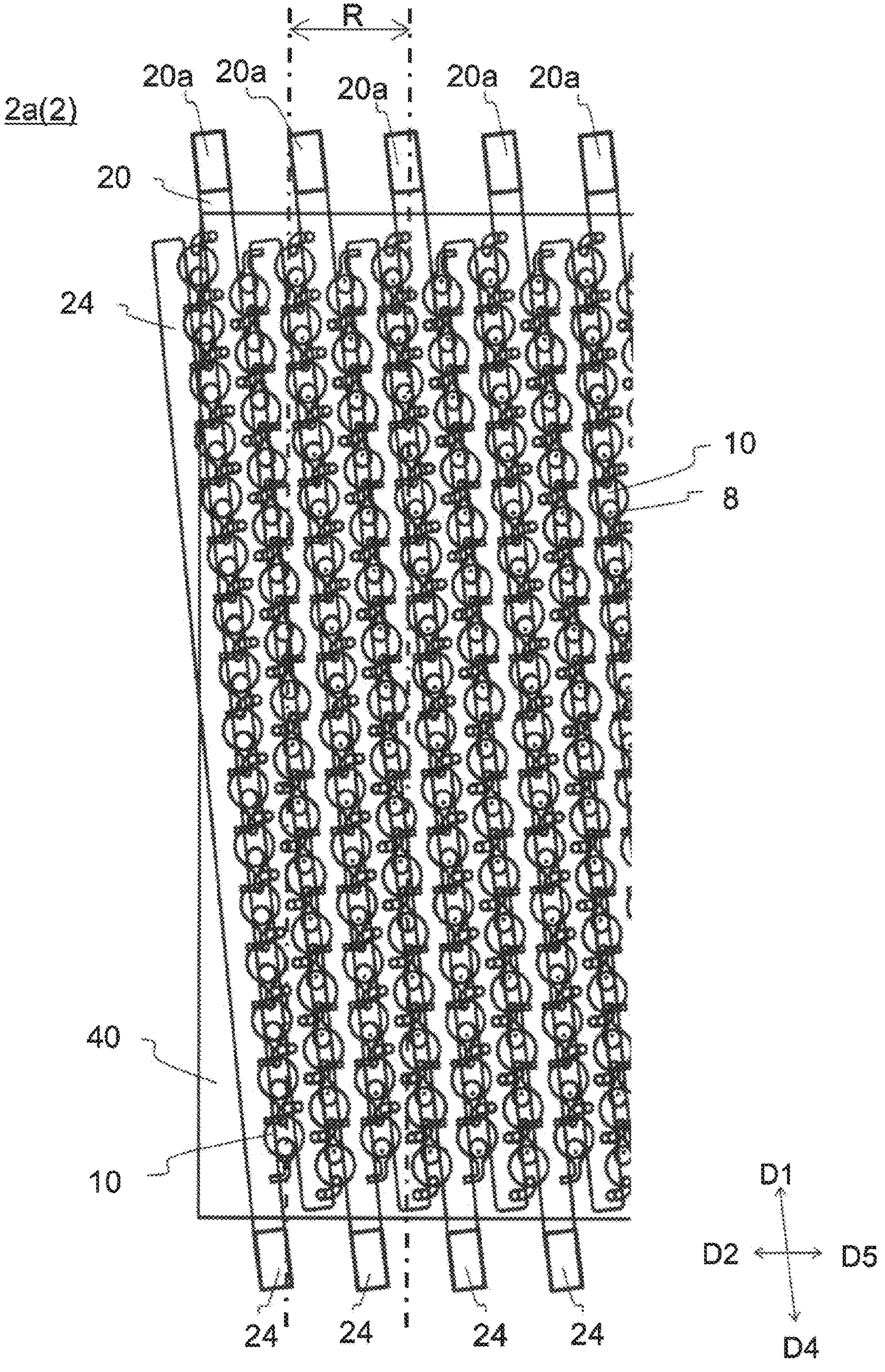
FIG. 6 is a plan view showing a portion in FIG. 5 enlarged.

As shown in FIG. 4A, the head body 2*a* is shaped long from the second direction D2 toward the fifth direction D5 and has a first channel member 4, second channel member 6, and piezoelectric actuator substrate 40. The piezoelectric actuator substrate 40 and second channel member 6 are provided on the first channel member 4. The piezoelectric actuator substrate 40 is placed in a region E as indicated by a broken line in FIG. 4A. The piezoelectric actuator substrate 40 is provided so as to pressurize a plurality of pressurizing chambers 10 (see FIG. 7B) provided in the first channel member 4 and has a plurality of displacement members 48 (see FIG. 7B). Note that, the piezoelectric actuator substrate 40 having the displacement elements 48 for pressurizing the pressurizing chambers 10 is the pressurizing member. The pressurizing member will be explained below by using the piezoelectric actuator substrate.

Figure 7A:
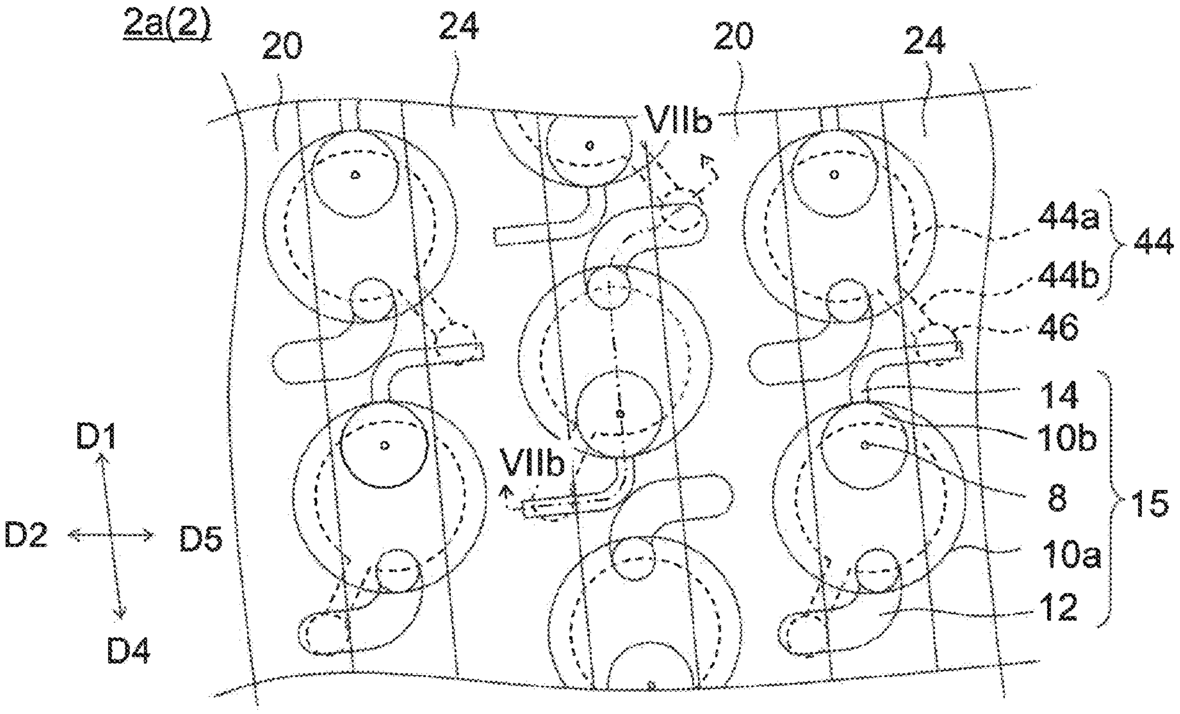
FIG. 7A is a plan view showing a portion in FIG. 6 enlarged.
Figure 7B:
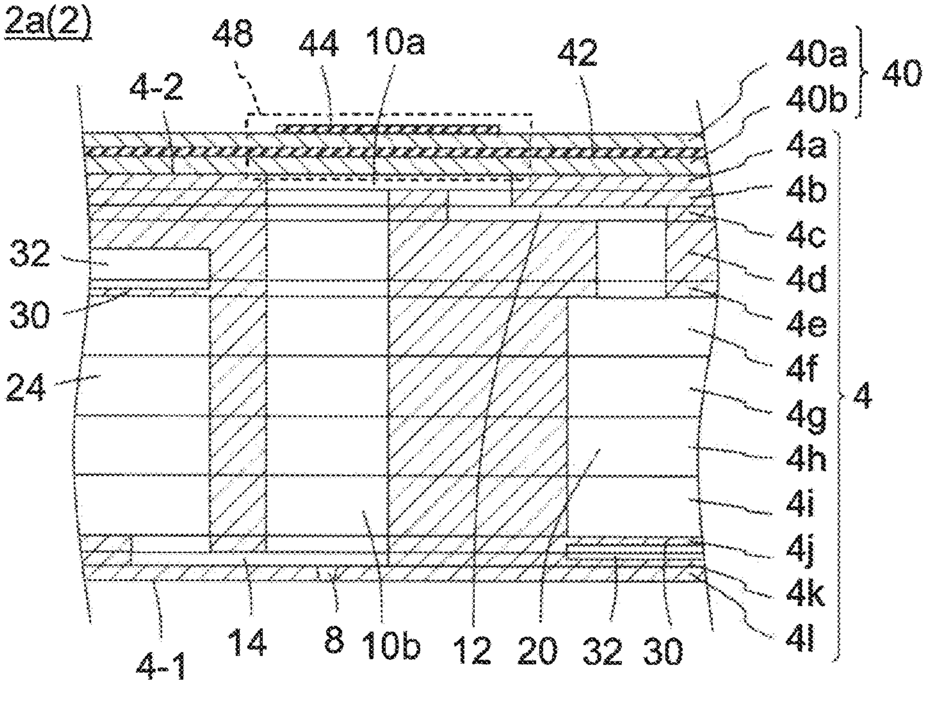
FIG. 7B is a cross-sectional view taken along the VIIb-VIIb line in FIG. 7A.

The first channel member 4 has channels inside it and guides the liquid supplied from the second channel member 6 to the ejection ports 8 (see FIG. 7B). The first channel member 4 has a first surface 4-1 and second surface 4-2. The ejection ports 8 are formed in the first surface 4-1. Further, in the second surface 4-2, openings 20*a* and 24*a* are formed.

The openings 20*a* are arranged along a line from the second direction D2 to the fifth direction D5 and are arranged in the end part on the third direction D3 side in the second surface 4-2. The openings 24*a* are arranged along a line from the second direction D2 to the fifth direction D5 and are arranged in the end part on the sixth direction D6 side in the second surface 4-2.

The second channel member 6 has channels formed inside it and guides the liquid supplied from the liquid tank provided at the outside to the first channel member 4. The second channel member 6 has a third surface 6-3 and fourth surface 6-4. The third surface 6-3 of the second channel member 6 is placed on the second surface 4-2 of the first channel member 4.

The second channel member 6 is joined through an adhesive (not shown) with the first channel member 4 at the outside of the mounting region E for the piezoelectric actuator substrate 40 which is indicated by a broken line. Due to this, the first channel member 4 and the second channel member 6 are communicated.

As shown in FIGS. 4A and 4B and 5A and 5B, the second channel member 6 has a plurality of first through holes 6*a*, through holes 6*b* and 6*c*, first opening 6*d*, openings 22*a* and 26*a*, and raised part 6*e*. The raised part 6*e* has a connection part 6*f* connecting the adjoining first through holes 6*a*. The first through holes 6*a* are provided on the raised part 6*e* so as to extend from the second direction D2 to the fifth direction D5 and are arranged on the outer side from the mounting region E for the piezoelectric actuator substrate 40. The signal transmission members 60 are inserted through the first through holes 6*a*.

The through hole 6*b* is arranged in the end part on the second direction D2 side in the second channel member 6 and supplies the liquid from the liquid tank to the second channel member 6. The through hole 6*c* is arranged in the end part on the fifth direction D5 side in the second channel member 6 and collects the liquid from the second channel member 6 to the liquid tank. The first opening 6*d* is provided in the third surface 6-3 of the second channel member 6. The piezoelectric actuator substrate 40 is accommodated in a space formed by the first opening 6*d* and the first channel member 4.

The opening 22*a* is provided in the third surface 6-3 of the second channel member 6 and is provided so as to extend from the second direction D2 toward the fifth direction D5. The opening 22*a* is formed in the end part on the third direction D3 side in the second channel member 6 and is provided nearer the third direction D3 side from the first through hole 6*a*. The opening 22*a* is communicated with the through hole 6*b*, and the first combined channel 22 is formed by sealing the opening 22*a* by the first channel member 4.

The opening 26*a* is provided in the third surface 6-3 of the second channel member 6 and is provided so as to extend from the second direction D2 toward the fifth direction D5. The opening 26*a* is formed in the end part on the sixth direction D6 side in the second channel member 6 and is provided nearer the sixth direction D6 side from the first through hole 6*a*. The opening 26*a* is communicated with the through hole 6*c*, and the second combined channel 26 is formed by sealing the opening 26*a* of the first channel member 4.

The first combined channel 22 is formed so as to extend from the second direction D2 to the fifth direction D5 and supplies the liquid to the openings 20*a* of the first channel member 4. The second combined channel 26 is formed so as to extend from the second direction D2 to the fifth direction D5 and collects the liquid from the openings 24*a* of the first channel member 4.

The raised part 6*e* protrudes upward from the fourth surface 6-4 and is arranged higher than the fourth surface 6-4. The first through holes 6*a* are formed in the raised part 6*e*. The height of the surface for forming the first through holes 6*a* therein becomes higher than the fourth surface 6-4 for forming the through holes 6*b* and 6*c* therein. Due to this, even in a case where the liquid leaks from the through holes 6*b* and 6*c* to the top of the fourth surface 6-4, since the first through holes 6*a* are provided in the raised part 6*e*, the leaked liquid becomes hard to flow to the inside through the first through holes 6*a*. The raised part 6*e* can be given a height of 1 to 5 mm. By the height being 1 mm or more, the liquid becomes harder to flow in from the first through holes 6*a*.

The connection part 6*f* is provided so as to connect the adjoining first through holes 6*a* and is formed so as to extend from the second direction D2 to the fifth direction D5. By provision of the connection part 6*f*, the piezoelectric actuator substrate 40 is covered by the connection part 6*f*, therefore the liquid becomes hard to deposit on the piezoelectric actuator substrate 40 positioned in the first opening 6*d*.

Further, the connection part of connects the first through holes 6*a* with each other, therefore the rigidity of the second channel member 6 can be raised, and it becomes harder for deformation to occur in the second channel member 6.

By the above configuration, in the second channel member 6, the liquid supplied from the liquid tank to the through hole 6*b* is supplied to the first combined channel 22 and flows through the openings 20*a* and 22*a* into the first common channels 20, thus the liquid is supplied to the first channel member 4. Further, the liquid collected by the second common channels 24 flows through the openings 24*a* and 26*a* into the second combined channel 26, and the liquid is collected at the outside through the through hole 6*c*.

The first channel member 4 will be explained by using FIGS. 5A and 5B to 7A and 7B.

The first channel member 4 is formed by stacking a plurality of plates 4*a* to 4*g* and has the first surface 4-1 and second surface 4-2. The piezoelectric actuator substrate 40 is placed on the second surface 4-2. The liquid is ejected from the ejection ports 8 provided in the first surface 4-1. The plurality of plates 4*a* to 4*g* can be formed by a metal, alloy, or resin. Note that, the first channel member 4 may also be formed integrally by a resin without stacking a plurality of plates 4*a* to 4*g*.

In the first channel member 4, a plurality of first common channels 20, a plurality of second common channels 24, and a plurality of individual units 15 are formed. The openings 20*a* and 24*a* are formed in the second surface 4-2.

The first common channels 20 are provided so as to extend from the first direction D1 to the fourth direction D4 and are formed so as to communicate with the openings 20*a*. Further, a plurality of first common channels 20 are arranged from the second direction D2 toward the fifth direction D5.

The second common channels 24 are provided so as to extend from the fourth direction D4 to the first direction D1 and are formed so as to communicate with the openings 24*a*. Further, the plurality of second common channels 24 are arranged from the second direction D2 toward the fifth direction D5. Each is arranged between each adjoining first common channels 20. For this reason, the first common channels 20 and the second common channels 24 are alternately arranged from the second direction D2 toward the fifth direction D5.

Ejection units 15 are provided between adjacent first common channels 20 and second common channels 24 and are formed in a matrix in the planar direction of the first channel member 4. The angle formed by the first direction D1 and fourth direction D4 and by the second direction D2 and fifth direction D5 becomes larger than a right angle. For this reason, the ejection units 15 which are connected to the same first common channel 20 will be arranged offset to the second direction D2, therefore printing can be carried out so as to fill a predetermined range with pixels formed by the ejected liquid.

When projecting the ejection ports 8 to the third direction D3 and sixth direction D6, 32 ejection ports 8 are projected in a range of a virtual straight line R. The ejection ports 8 are lined up at an interval of 360 dpi within the virtual straight line R. Due to this, if printing while conveying the recording medium P in a direction perpendicular to the virtual straight line R, printing can be carried out with a resolution of 360 dpi.

Each of the ejection units 15, as shown in FIGS. 7A and 7B, has an ejection port 8, pressurizing chamber 10, first individual channel 12, and second individual channel 14. Note that, in the liquid injection head 2, the liquid is supplied from the first individual channel 12 to the pressurizing chamber 10. The second individual channel 14 collects the liquid from the pressurizing chamber 10.

The pressurizing chamber 10 has a pressurizing chamber body 10*a* and partial channel 10*b*. The pressurizing chamber body 10*a* forms a circular shape when viewed on a plane. The partial channel 10*b* extends from the center of the pressurizing chamber body 10*a* toward the lower part. The pressurizing chamber body 10*a* is configured so as to apply pressure to the liquid in the partial channel 10*b* by pressure received from the displacement element 48 provided on the pressurizing chamber body 10*a*.

The pressurizing chamber body 10*a* has a right circular cylinder shape. Its planar shape is a round shape. By the planar shape being a round shape, the amount of displacement and a change of volume of the pressurizing chamber 10 caused by displacement can be made larger.

The partial channel 10*b* has a right circular cylinder shape smaller in diameter than the pressurizing chamber body 10*a*. Its planar shape is a round shape. The partial channel 10*b*, when seen from the second surface 4-2, is arranged at a position contained in the pressurizing chamber body 10*a*. The partial channel 10*b* connects the pressurizing chamber body 10*a* and the ejection port 8.

Note that, the partial channel 10*b* may have a conical shape or truncated cone shape becoming smaller in cross-sectional area toward the ejection port 8 side as well. Due to this, the channel resistances of the first common channel 20 and second common channel 24 can be raised, therefore the difference of pressure loss can be made small.

The pressurizing chambers 10 are arranged along the two sides of the first common channel 20. The first common channel 20 and the pressurizing chambers 10 which are lined up on the two sides thereof are connected through the first individual channels 12. Further, the pressurizing chambers 10 are arranged along the two sides of the second common channel 24, and the second common channel 24 and the pressurizing chambers 10 which are lined up on the two sides thereof are connected through the second individual channels 14.

The first individual channel 12 connects the first common channel 20 and the pressurizing chamber body 10*a*. The first individual channel 12 extends upward from the upper surface of the first common channel 20, then extends toward the second direction D2 or fifth direction D5 and is connected to the lower surface of the pressurizing chamber body 10*a*.

The second individual channel 14 connects the second common channel 24 and the partial channel 10*b*. The second individual channel 14 extends from the lower surface of the second common channel 24 toward the second direction D2 or fifth direction D5 and extends toward the first direction D1 or fourth direction D4, then is connected to the side surface of the partial channel 10*b*.

By the configuration as described above, in the first channel member 4, the liquid supplied through the openings 20*a* to the first common channels 20 flows through the first individual channels 12 into the pressurizing chamber bodies 10*a* and is supplied to the partial channels 10*b*. Part of the liquid is ejected from the ejection ports 8. Further, the remaining liquid is collected from the partial channels 10*b* through the second individual channels 14 to the second common channels 24 and are collected through the openings 24*a* from the first channel member 4 to the second channel member 6.

The piezoelectric actuator substrate 40 including the displacement elements 48 is joined to the upper surface of the first channel member 4. Each displacement element 48 is arranged so as to be positioned at the pressurizing chamber 10. The piezoelectric actuator substrate 40 occupies a region having substantially the same shape as that of the pressurizing chamber group formed by the pressurizing chambers 10. Further, the opening of each pressurizing chamber 10 is closed by joining the piezoelectric actuator substrate 40 to the second surface 4-2 of the first channel member 4.

The piezoelectric actuator substrate 40 has a stacked structure configured by piezoelectric members, that is, two piezoelectric ceramic layers 40*a* and 40*b*. Each of these piezoelectric ceramic layers 40*a* and 40*b* has a thickness of about 20 μm. Both piezoelectric ceramic layers 40*a* and 40*b* extend across the plurality of pressurizing chambers 10.

These piezoelectric ceramic layers 40*a* and 40*b* are for example made of ceramic materials having ferroelectricity such as lead zirconate titanate (PZT)-based, $NaNbO_3$-based, $BaTiO_3$-based, $(BiNa)NbO_3$-based, $BiNaNb_5O_{15}$-based, or other materials. Note that, the piezoelectric ceramic layer 40*b* acts as a vibration plate. It does not always have to be a piezoelectric substance. Another ceramic layer which is not a piezoelectric substance or a metal plate may be used in place of the former.

On or in the piezoelectric actuator substrate 40, a common electrode 42, individual electrodes 44, and connection electrodes 46 are formed. The common electrode 42 is formed over almost the entire surface of the surface direction in a region between the piezoelectric ceramic layer 40*a* and the piezoelectric ceramic layer 40*b*. Further, the individual electrodes 44 are arranged at positions facing the pressurizing chambers 10 in the upper surface of the piezoelectric actuator substrate 40.

The portions in the piezoelectric ceramic layer 40*a* which are sandwiched between the individual electrodes 44 and the common electrode 42 are polarized in the thickness direction and become the displacement elements 48 of unimorph structures which displace when applying voltage to the individual electrodes 44. For this reason, the piezoelectric actuator substrate 40 has a plurality of displacement elements 48.

The common electrode 42 can be formed by an Ag—Pd-based or other metal material. The thickness of the common electrode 42 can be set to about 2 μm. The common electrode 42 has a common electrode-use surface electrode (not shown) on the piezoelectric ceramic layer 40*a*. The common electrode-use surface electrode is linked through via holes formed penetrating through the piezoelectric ceramic layer 40*a* with the common electrode 42 and is grounded and held at the ground potential.

The individual electrodes 44 are formed by Au-based or other metal materials. Each has an individual electrode body 44*a* and extraction electrode 44*b*. As shown in FIG. 7A, the individual electrode body 44*a*, when viewed on a plane, is formed in a substantially circular shape and is formed smaller than the pressurizing chamber body 10*a*. The extraction electrode 44*b* is led out from the individual electrode body 44*a*. The connection electrode 46 is formed on the led out extraction electrode 44*b*.

The connection electrode 46 is formed by for example silver-palladium containing glass frit, has a thickness of about 15 μm, and is formed in a convex shape. The connection electrode 46 is electrically joined with the electrode (not shown) provided in the signal transmission member 60.

Next, the ejection operation of liquid will be explained. Under the control from the control part 76, the displacement elements 48 displace by the driving signals supplied to the individual electrodes 44 through the driver IC 62 etc. As the driving method, use can be made of so-called pull-push driving.

Figure 8A:
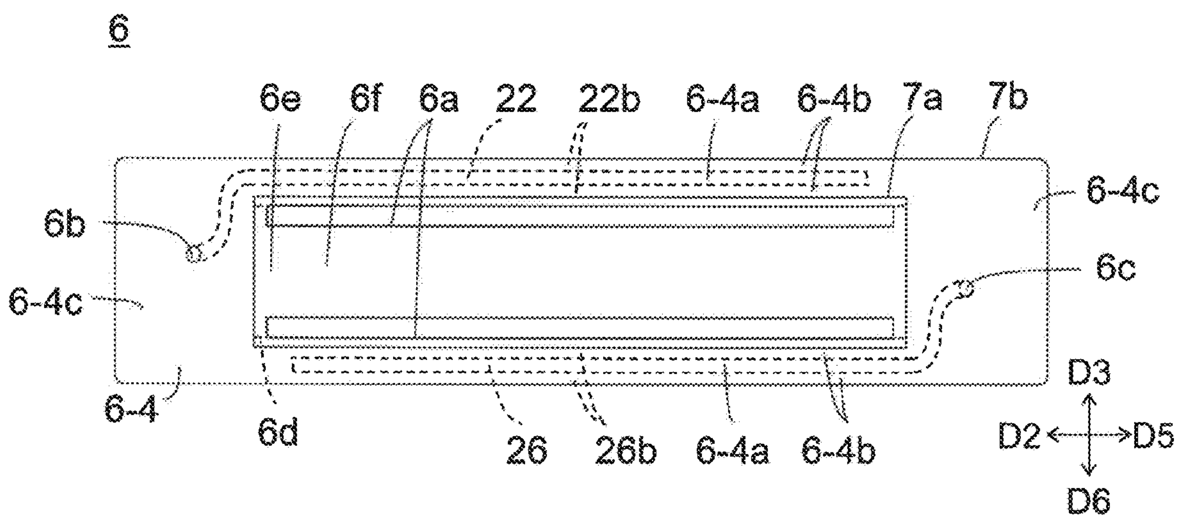
FIG. 8A is a plan view of the second channel member.
Figure 8B:
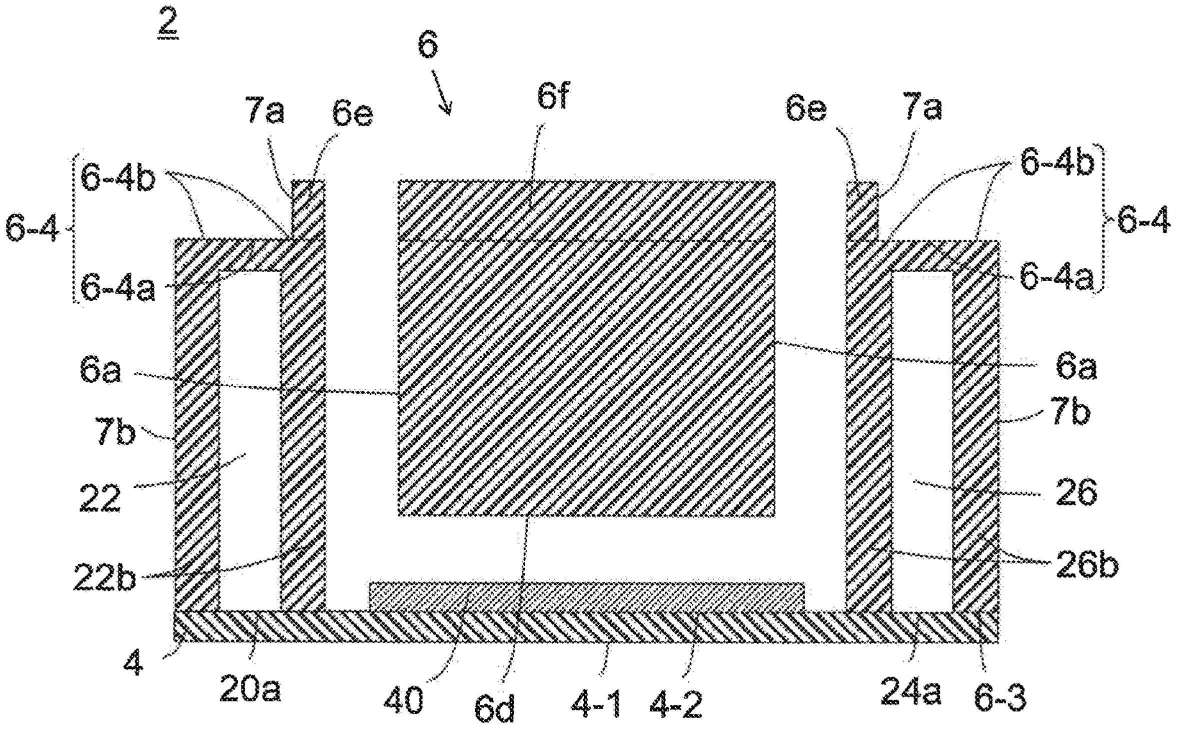
FIG. 8B is a cross-sectional view of the liquid ejection head enlarged.

FIGS. 8A and 8B will be used to explain in detail connection of the first channel member 4 and the second channel member 6. Note that, in FIG. 8B, illustration of the signal transmission member 60 is omitted.

The first channel member 4 and the second channel member 6 are connected by an epoxy-based adhesive (not shown) by using the second surface 4-2 of the first channel member 4 and the third surface 6-3 of the second channel member 6 as joining surfaces.

In the second channel member 6, the first combined channels 22 and second combined channels 26 are formed inside. An explanation will be given below by using the first combined channel 22 and second combined channel 26 as the first channels. The first combined channel 22 is formed by partition walls 22*b* and the second surface 4-2 of the first channel member 4. The second combined channel 26 is formed by partition walls 26*b* and the second surface 4-2 of the first channel member 4.

The fourth surface 6-4 of the second channel member 6 has first partial areas 6-4*a*, second partial areas 6-4*b*, and third partial areas 6-4*c*. A first partial area 6-4*a* is a partial area which is positioned on the first combined channel 22 or second combined channel 26. A second partial area 6-4*b* is a partial area which is positioned on the partition walls 22*b* of the first combined channel 22 or on the partition walls 26*b* of the second combined channel 26. A third partial area 6-4*c* is a partial area which is positioned on outer side from the first opening 6*d* and is other than the first partial areas 6-4*a* and second partial areas 6-4*b*.

The raised part 6*e* is provided so as to protrude upward from the fourth surface 6-4 of the second channel member 6. The raised part 6*e*, when viewed on a plane, is provided at the center of the second direction D2, the fifth direction D5, the third direction D3 and the sixth direction D6 on the fourth surface 6-4 of the second channel member 6. The outer circumference 7*a* of the raised part 6*e*, when viewed on a plane, is positioned on inner side from the outer circumference 7*b* of the fourth surface 6-4. Further, the outer circumference of the first opening 6*d* is positioned on inner side from the outer circumference 7*a* of the raised part 6*e*.

The connection method of the first channel member 4 and the second channel member 6 will be explained. First, the third surface 6-3 of the second channel member 6 is coated with an adhesive and is positioned with and superimposed on the second surface 4-2 of the first channel member 4. Next, using a predetermined jig, the fourth surface 6-4 of the second channel member 6 is pressed to connect the first channel member 4 and the second channel member 6. Next, the second channel member 6 is press-fixed while predetermined heat is applied to cure the adhesive and thereby connect the first channel member 4 and the second channel member 6.

Here, when pressing against the second channel member 6 from the fourth surface 6-4 side, it is necessary to simultaneously press against both of the fourth surface 6-4 and the upper surface of the raised part 6*e* in order to connect the first channel member 4 and the second channel member 6 since the raised part 6*e* protrudes from the fourth surface 6-4. However, the fourth surface 6-4 and the raised part 6*e* are different in height, therefore they sometimes cannot be pressed with a uniform force. Due to this, a uniform pressing force is not given to the joining surfaces of the first channel member 4 and the second channel member 6, therefore the seal of the joining surfaces of the first channel member 4 and second channel member 6 is liable to degrade.

Contrary to this, in the liquid ejection head 2, when viewed on a plane, the outer circumference 7*a* of the raised part 6*e* is positioned on the inner side from the outer circumference 7*b* of the fourth surface 6-4. For this reason, when viewed on a plane, the fourth surface 6-4 of the second channel member 6 surrounds the raised part 6*e*. As a result, by pressing against only the fourth surface 6-4, the first channel member 4 and the second channel member 6 can be connected, and a uniform pressing force can be given to the joining surfaces of the first channel member 4 and second channel member 6. Therefore, the seal of the first channel member 4 and the second channel member 6 can be improved.

That is, by pressing against only the fourth surface 6-4 surrounding the raised part 6*e*, a uniform pressing force can be given to the joining surfaces of the first channel member 4 and second channel member 6, therefore the seal of the joining surfaces of the first channel member 4 and the second channel member 6 corresponding to the fourth surface 6-4 can be raised.

Note that, the outer circumference 7*a* of the raised part 6*e* means the outer edge of the raised part 6*e* when viewed on a plane, while the outer circumference 7*b* of the fourth surface 6-4 means the outer edge of the fourth surface 6-4 when viewed on a plane.

Further, on the fourth surface 6-4, the first partial areas 6-4*a* which are positioned on the first combined channel 22 and second combined channel 26 are formed flush. In other words, on the fourth surface 6-4, the first partial areas 6-4*a* positioned on the first combined channel 22 and second combined channel 26 are formed flat. Due to this, the pressing force generated when pressing against the second channel member 6 will be uniformly applied to the first partial areas 6-4*a* provided on the fourth surface 6-4. As a result, deformation of the second channel member 6 becomes harder to occur in areas positioned between the first partial areas 6-4*a* and the openings 22*a* and 26*a*, therefore deformation becomes harder to occur in the first combined channel 22 and second combined channel 26.

Therefore, the cross-sectional areas of the first combined channel 22 and the second combined channel 26 can be made almost constant, the pressure loss up to each ejection unit 15 (see FIG. 7) can be made almost constant, therefore variation of ejection characteristics of the ejection units 15 can be reduced.

Further, in the fourth surface 6-4, the second partial areas 6-4*b* which are positioned on the partition walls 22*b* of the first combined channel 22 and on the partition walls 26*b* of the second combined channel 26 are formed flush. In other words, in the fourth surface 6-4, the second partial areas 6-4*b* which are positioned on the partition walls 22*b* of the first combined channel 22 and on the partition walls 26*b* of the second combined channel 26 are formed flat. Due to this, the joining surfaces of the first channel member 4 and the second channel member 6 which correspond to the second partial areas 6-4*b* can be pressed with a uniform pressing force, therefore the seal between the first channel member 4 and the second channel member 6 can be improved.

That is, with respect to the joining surfaces of the first channel member 4 and the second channel member 6 which become the bonding margin, by directly pressing against the second partial areas 6-4*b*, a uniform pressing force can be applied to the joining surfaces of the first channel member 4 and second channel member 6, therefore the seal between the first channel member 4 and the second channel member 6 can be improved.

In particular, in the case of the second channel member 6 which is formed long from the second direction D2 toward the fifth direction D5, sometimes warping or bending occurs in the second channel member 6 from the second direction D2 to the fifth direction D5. Contrary to this, in the liquid ejection head 2, by the second partial areas 6-4*b* being formed flush, the second partial areas 6-4*b* can be strongly pressed, therefore the seal between the first channel member 4 and the second channel member 6 can be raised.

Further, in the second channel member 6, the first opening 6*d* is formed in the fourth surface 6-4, the piezoelectric actuator substrate 40 is accommodated in a space formed by the first opening 6*d* and the first channel member 4, and the fourth surface 6-4 is formed flush in the part positioned on the outer side from the first opening 6*d*. In other words, the fourth surface 6-4 in the part positioned on outer side from the first opening 6*d* is formed flat. Due to this, a uniform pressing force can be given to the joining surfaces of the first channel member 4 and the second channel member 6, therefore the space formed by the first opening 6*d* and the first channel member 4 can be sealed. As a result, when the piezoelectric actuator substrate 40 is arranged in the space, the piezoelectric actuator substrate 40 can be sealed, and the possibility of occurrence of breakage in the liquid ejection head 2 can be reduced.

Note that, the flush formation of the fourth surface 6-4, first partial areas 6-4*a*, second partial areas 6-4*b*, and third partial areas 6-4*c* indicate flat formation of the fourth surface 6-4, first partial areas 6-4*a*, second partial areas 6-4*b*, and third partial areas 6-4*c* and indicates that the flatness is 0.3 or less.

Further, the second channel member 6 has the connection part of connecting the first through holes 6*a* which are adjacent to each other. For this reason, the rigidity which was made low due to the provision of the first through holes 6*a* can be raised by the connection part 6*f*, and deformation becomes harder to occur in the second channel member 6. Therefore, the evenness of the fourth surface 6-4 of the second channel member 6 can be held, and the seal between the first channel member 4 and the second channel member 6 can be improved.

Further, by arrangement of the connection part 6*f* above the piezoelectric actuator substrate 40, the piezoelectric actuator substrate 40 is covered by the connection part 6*f*. Therefore, even if ink or ink mist intrudes from the upper part of the second channel member 6, leakage of it onto the piezoelectric actuator substrate 40 becomes harder.

Further, the signal transmission members 60 are led out to the upper part in a state contacting the raised part 6*e* configuring the first through holes 6*a*. For this reason, the signal transmission members 60 are guided by the raised part 6*e* to be led out to the upper part. As a result, it becomes easier to lead out the signal transmission members 60 to the upper part, therefore the productivity of liquid ejection head 2 can be improved.

Note that, an example in which the liquid ejection head 2 had a plurality of first through holes 6*a* was shown, but the present disclosure is not limited to this. The liquid ejection head 2 may have just one first through hole 6*a* as well.

Second Embodiment

Figure 9A:
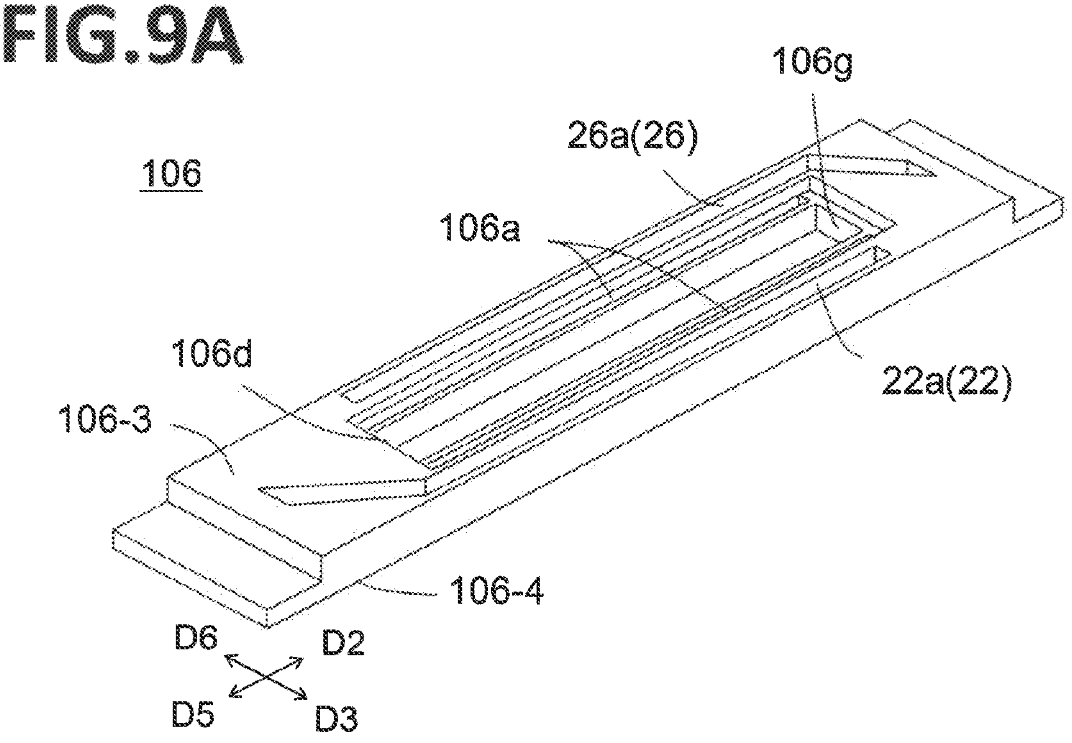
Figure 9B:
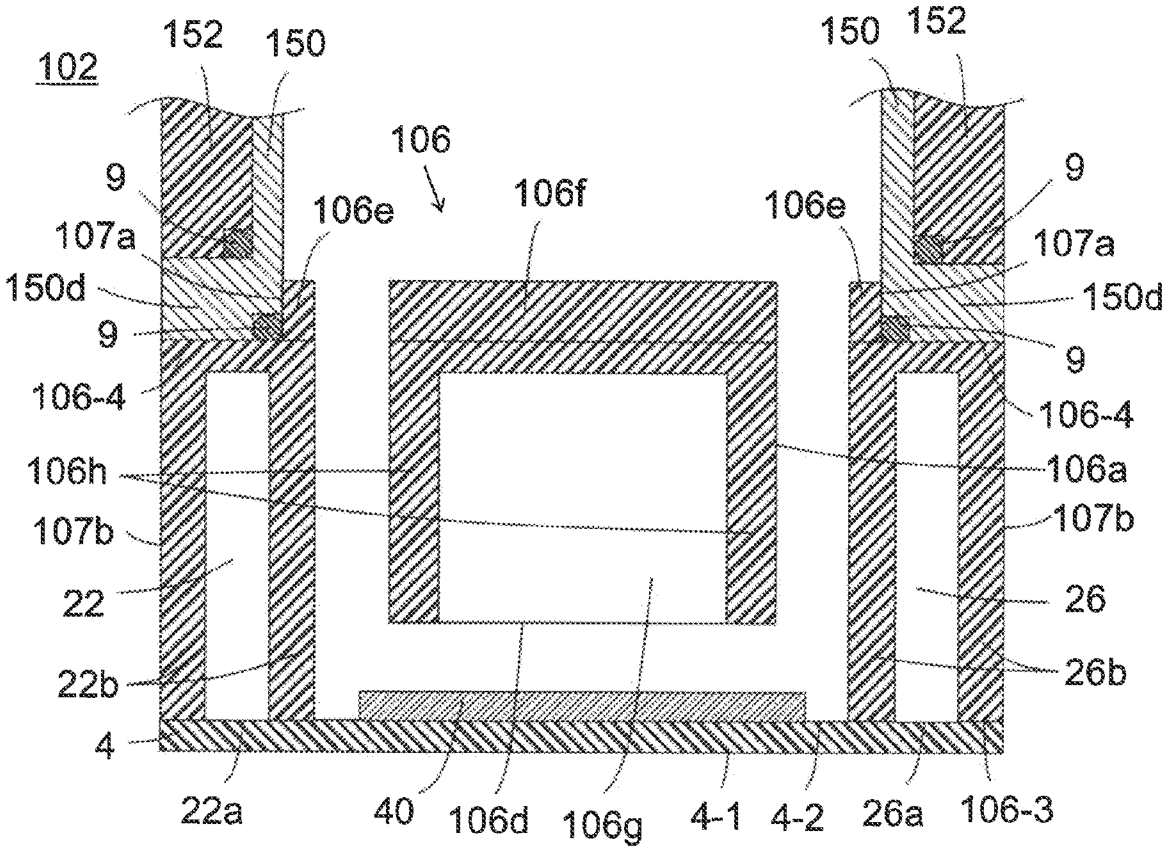

A liquid ejection head 102 according to a second embodiment will be explained by using FIGS. 9A and 9B. Note that, the same notations are attached to the same members.

The liquid ejection head 102 is provided with a first channel member 4, piezoelectric actuator substrate 40, second channel member 106, housing 150, heat dissipation plates 152, and elastic members 9. The second channel member 106 has a third surface 106-3, fourth surface 106-4, first through holes 106*a*, and raised part 106*e*. The connection member 106*f* is provided with a first opening 106*d* opening on the third surface 106-3 side and a second opening 106*g* opening on the third surface 106-3 side. The second opening 106*g* is provided communicating with the first opening 106*d*.

The connection part 106*f* is provided with the second opening 106*g* opening on the third surface 106-3 side. Due to this, the rigidity of the second channel member 106 is secured, while the weight of the second channel member 106 can be lightened. In particular, this is useful in a case where the liquid ejection head 102 is used in a serial printer.

Further, the width of the partition wall 106*h* of the connection part 106*f*, which is between the first through hole 106*a* and the second opening 106*g*, is equal to the width of the partition wall 22*b* of the first combined channel 22 and the width of the partition wall 26*b* of the second combined channel 26.

Due to this, when the second channel member 106 is fabricated by injection molding, the speed for filling resin into the partition walls 106*f* of the connection part 106*f* between the first through holes 106*a* and the second opening 106*g* and into the partition walls 22*b* of the first combined channel 22 and the partition walls 26*b* of the second combined channel 26 can be made close to uniform.

As a result, it becomes harder for variation to occur in the thicknesses of the connection part 106*f*, partition walls 22*b* of the first combined channel 22, and partition walls 26*b* of the second combined channel 26, therefore a second channel member 106 resistant to deformation can be supplied.

Note that, "equal thickness" of the partition walls 106*f*, 22*b*, and 26*b* includes manufacturing error and is a concept including a range of ±15%.

The housing 150 is provided on the second channel member 106 and is placed on the fourth surface 106-4 which is positioned on the outer side from the raised part 106*e*. For this reason, compared with a case where the housing 150 is placed on the fourth surface 106-4 and on the raised part 106*e*, the height of the liquid ejection head 102 can be made lower, therefore the liquid ejection head 102 can be made smaller in size.

Further, by flush formation of the fourth surface 106-4, the housing 150 is stably placed. As a result, concentration of stress to the joined portions of the housing 150 and the second channel member 106 becomes harder, therefore the reliability of the liquid ejection head 102 can be improved.

Further, the elastic member 9 is provided adjacent to the outer circumference 107*a* of the raised part 106*e*. It is provided so as to surround the outer circumference 107*a* in a state contacting the outer circumference 107*a* of the raised part 106*e*. For this reason, when joining the housing 150 to the second channel member 106, even if the heat insulation portions 150*d* are pressed by the second channel member 106, due to elastic deformation of the elastic member 9, the possibility of breakage in the heat insulation portions 150*d* can be reduced.

Further, by the elastic member 9 being provided so as to contact the outer circumference 107*a* of the raised part 106, the seal between the raised part 106*e* and the housing 150 can be improved. The elastic members 9 can be formed by for example a resin material.

Further, the elastic member 9 is in contact with the raised part 106*e* and the fourth surface 106-4 of the second channel member 106. Therefore, even if the housing 150 is pressed by the raised part 106*e* and fourth surface 106-4, the possibility of breakage in the housing 150 can be reduced.

That is, when bonding the housing 150 to the second channel member 106 or bonding the heat dissipation plates 152 to the housing 150, there is possibility that the housing 150 will be pressed toward the raised part 106*e* side or the fourth surface 106-4. However, the elastic member 9 is in contact with the raised part 106*e* and with the fourth surface 106-4 of the second channel member 106, therefore breakage hardly occurs in the housing 150.

Further, the elastic member 9 is also provided between the housing 150 and the heat dissipation plates 152. Due to this, even if the heat dissipation plates 152 are pressed by the raised part 106*e*, the possibility of breakage can be reduced and the seal of the opening 50*a* of the housing 150 (see FIG. 2) can be raised.

The elastic members 9 may be formed by coating and curing an epoxy-based resin. Use may also be made of O-rings made of resin or metal.

Third Embodiment

Figure 10:
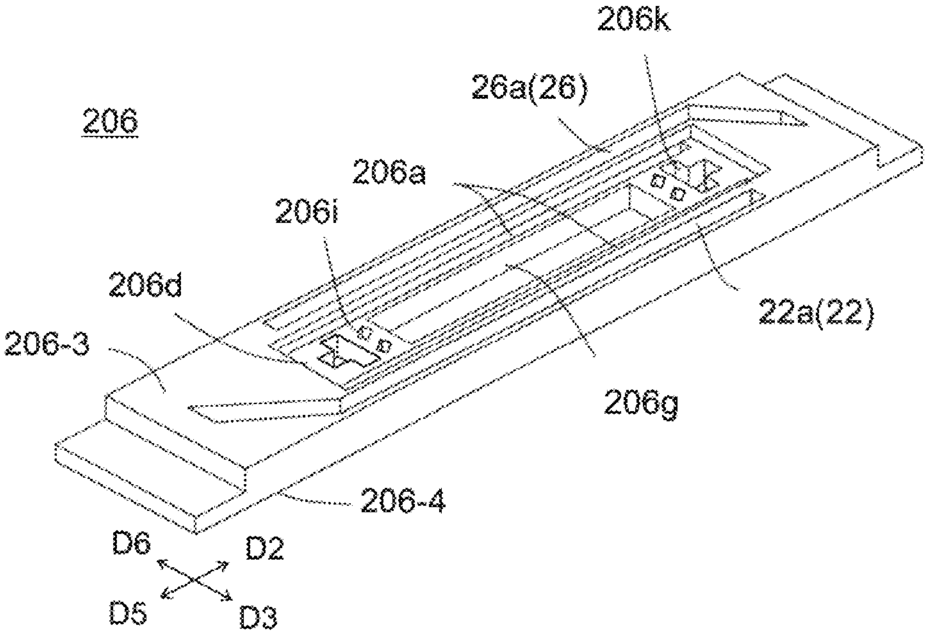
FIG. 10 shows a liquid ejection head according to a third embodiment and is a perspective view of the second channel member seen from the third surface side.
Figure 11A:
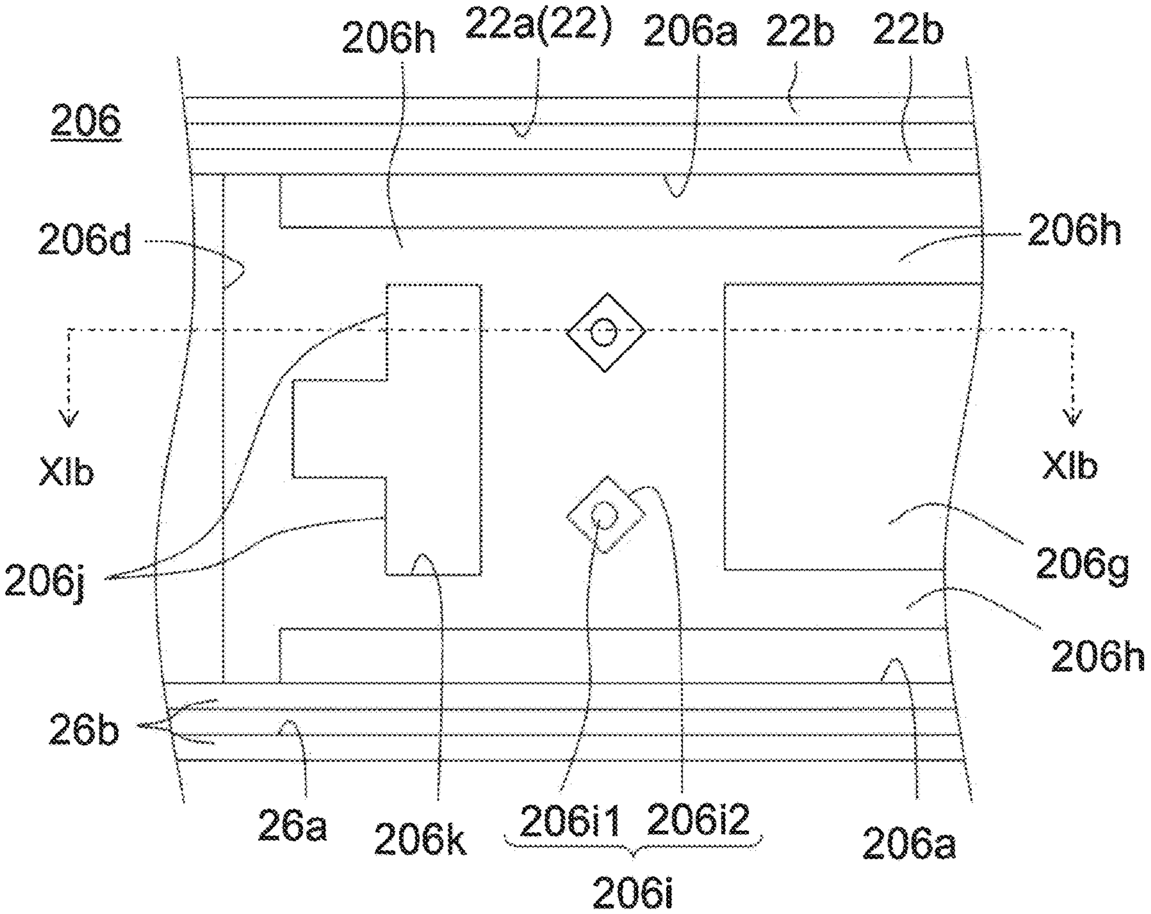
FIG. 11A is a plan view showing a portion in the liquid ejection head according to the third embodiment enlarged.
Figure 11B:
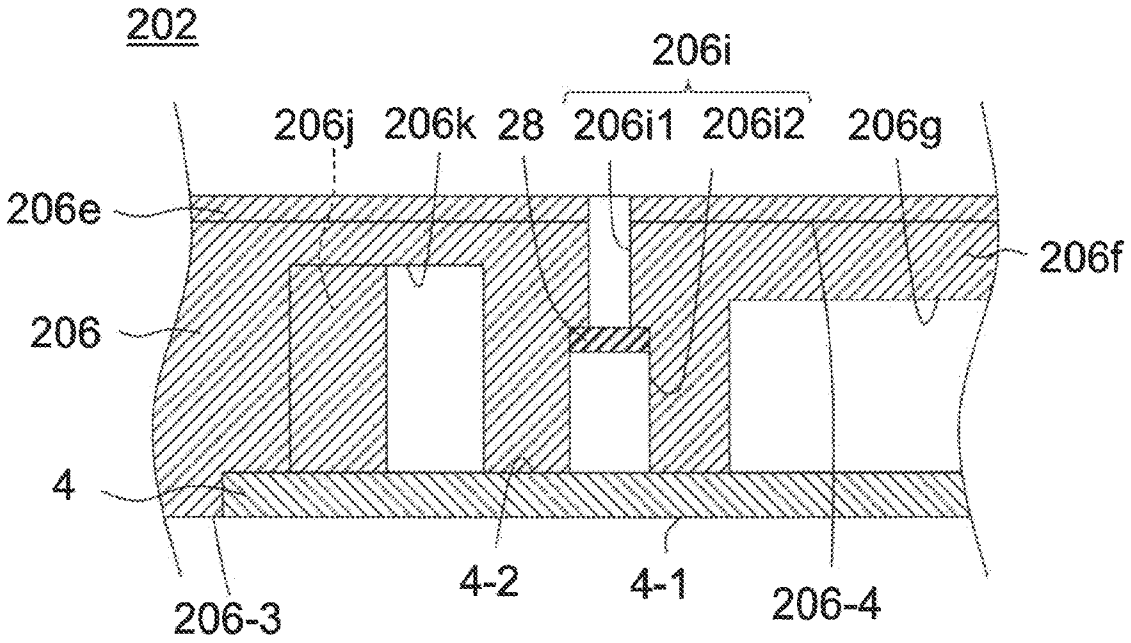
FIG. 11B is a cross-sectional view taken along the XIb-XIb line in FIG. 11A.

A liquid ejection head 202 according to a third embodiment will be explained by using FIGS. 10 and 11A and 11B.

A second channel member 206 has a third surface 206-3, fourth surface 206-4, first through holes 206*a*, raised part 206*e*, and connection part 206*f*.

The connection part 206*f* is provided with a first opening 206*d* opening on the third surface 206-3 side, a second opening 206*g* opening on the third surface 206-3 side, third openings 206*k*, and second through holes 206*i*. The second opening 206*g* is provided in communication with the first opening 206*d*.

The third openings 206*k* are provided so as to communicate with the first opening 206*d* and are provided away from the second opening 206*g*. Each of the third openings 206*k*, when viewed on a plane, is provided outside the second opening 206*g* on the second direction D2 side or on the fifth direction D5 side.

In the connection part 207*f*, when viewed on a plane, the third openings 206*k* are provided on the outside of the second opening 206*g*. In other words, each of the third openings 206*k* is provided outside the second opening 206*g* on the second direction D2 side or on the fifth direction D5 side. Due to this, when preparing the second channel member 206 by injection molding, even if resin is filled from the fifth direction D5 toward the second direction D2, flow of a large amount of resin to the connection part 207*f* becomes harder. Due to this, shortage of resin becomes harder to occur in the partition walls 206*h* formed by the first through holes 206*a* and second opening 206*g*, in the partition walls 22*b* of the first combined channel 22, and in the partition walls 26*b* of the second combined channel 26.

That is, the resin flowing from the fifth direction D5 toward the second direction D2 flows easier to the connection part 206*f* having a large cross-sectional area. However, due to existence of the third opening 206*k*, the cross-sectional area of the partition wall 206*h* of the connection part 206*f* can be a made close to the cross-sectional area of each of the partition walls 22*b* and 26*b*, therefore the speed of filling resin in the vicinity of the third openings 206*k* can be made approximately uniform.

Note that, even in a case where the resin is filled from the second direction D2 toward the fifth direction D5, since the third opening 206*k* is provided outside the second opening 206*g* on the second direction D2 side, equal effects can be exhibited.

Further, the third openings 206*k*, when viewed on a plane, need not be individually provided outside the second opening 206*g* on the second direction D2 side and on the fifth direction D5 side either. They only have to be provided on the upstream side of the direction for filling resin from the second opening 206*g*.

Further, when viewed on a plane, a concave portion 206*j* is provided at the position opposite to the second opening 206*g* among walls configuring the third opening 206*k*. Due to this, when filling resin from the fifth direction D5 toward the second direction D2, resin flows more easily to the connection part 207*f* compared with the partition walls 22*b* and 22*d*, and shortage of resin becomes harder to occur in the connection part 207*f*. That is, the amount of the resin flowing into the partition walls 22*b* and 26*b* is secured, while a sufficient amount of resin can flow into the connection part 207*f*.

The second through holes 206*i* are provided so as to communicate with the first opening 206*d* and are provided away from the second opening 206*g* and third openings 206*k*. The second through holes 206*i* are provided between the second opening 206*g* and the third openings 206*k*.

The second through hole 206*i* has a first partial area 206*i*1 and second partial area 20612. The first partial area 206*i*1 is provided from the raised part 206*e* of the second channel member 206 toward the inside. The second partial area 20612 is provided from the first opening 206*d* of the second channel member 206 toward the internal portion. The first partial area 20611 and the second partial area 20612 are provided so as to communicate with each other.

The first partial area 206*i*1 exhibits a circular shape when viewed on a plane. The second partial area 20612 exhibits a rectangular shape when viewed on a plane. The second partial area 20612 has apexes at which the sides cross when viewed on a plane. The apexes are positioned so as to face the second direction D2. The diagonal line of the second partial area 20612 is formed longer than the diameter of the first partial area 20611. For this reason, when viewed on a plane, the second partial area 20612 is formed larger than the first partial area 20611.

In the second partial area 20612, a fastening member 28 is accommodated. As the fastening member 28, for example use can be made of a nut etc. A screw inserted from the raised part 206*e* side is screwed in the fastening member 28 and fixed. Due to this, the member provided on the second channel member 206 can be fastened to the second channel member 206

When viewed on a plane, the apexes of the second partial area 20612 are positioned so as to face the second direction D2. For this reason, where the second channel member 206 is prepared by injection molding, it becomes harder to prevent the flow of the supplied resin by the second through hole 206*i*. That is, the supplied resin strikes the apexes, then flows along the side of the second partial area 20612 to the partition wall 206*h* between the first through hole 206*a* and the second opening 206*g*. As a result, the resin can be smoothly supplied to the partition wall 206*h* between the first through hole 206*a* and the second opening 206*g*. Therefore, shortage of the resin which is supplied to the partition wall 206*h* becomes harder to occur.

Note that, the second partial area 20612 only have to be a polygonal shape when viewed on a plane and is not limited to a rectangular shape. For example, it may be a hexagonal shape. Further, the second through hole 206*i* need not have the first partial area 206*i*1 and second partial area 20612 and may be a polygonal prism shape.

The first, second, and third embodiments were explained above, but the present invention is not limited to the above embodiments. Various modifications are possible so far as not out of the gist of the same.

For example, the actuator substrate 40 was illustrated as a pressurizing member, but it is not limited to this. For example, a pressurizing member providing a heat generating portion for each pressurizing chamber 10, heating the liquid inside the pressurizing chamber 10 by the heat of the heat generating portion, and performing pressurization by thermal expansion of the liquid may be employed as well.

Further, as the liquid ejection head 2, a configuration supplying the liquid from the through hole 6*b* of the second channel member 6 and collecting the liquid which was not ejected from the through hole 6*c* was shown, but the configuration is not limited to this. For example, a configuration supplying liquid from the through hole 6*c* of the second channel member 6 and collecting the liquid which is not ejected from the through hole 6*b* may be employed as well.

REFERENCE SIGNS LIST

1 . . . color inkjet printer
2 . . . liquid ejection head
2*a* . . . head body
4 . . . first channel member
4*a* to 4*g* . . . plates
4-1 . . . first surface
4-2 . . . second surface
6, 106, 206 . . . second channel members
6*a*, 106*a*, 206*a* . . . first through holes
6*b*, 6*c* . . . through holes
6*d*, 106*d*, 206*d* . . . first openings
6*e*, 106*e*, 206*e* . . . raised parts
6*f*, 106*f*, 206*f* . . . connection parts
106*g*, 206*g* . . . , second openings
106*h*, 206*h* . . . partition walls
206*i* . . . second through hole
206*j* . . . concave portion
206*k* . . . third opening
6-3, 106-3, 206-3 . . . third surfaces
6-4, 106-4, 206-4 . . . fourth surfaces
8 . . . ejection port
10 . . . pressurizing chamber
12 . . . first individual channel
14 . . . second individual channel
15 . . . ejection unit
20 . . . first common channel
22 . . . first combined channel (first channel)
22*a* . . . partition wall
24 . . . second common channel
26 . . . second combined channel (first channel)
26*a* . . . partition wall
40 . . . piezoelectric actuator substrate (pressurizing member)
48 . . . displacement element
50 . . . housing
52 . . . heat dissipation plate
76 . . . control part
P . . . recording medium

The invention claimed is:

1. A liquid ejection head comprising:
a first channel member comprising:
a first surface,
a plurality of ejection ports in the first surface,
a second surface opposite to the first surface,
a third channel,
a plurality of pressurizing chambers in communication with the third channel and with the plurality of ejection ports respectively, and a fourth channel; and a second channel member on the second surface, comprising:

a first channel in communication with the third channel and configured using resin, and a second channel in communication with the third channel through the fourth channel.

2. The liquid ejection head according to claim 1, wherein the fourth channel is in communication with the third channel through the plurality of pressurizing chambers.

3. The liquid ejection head according to claim 2, wherein each of the plurality of pressurizing chambers comprises:

a pressurizing chamber body, and a partial channel that extends from the pressurizing chamber body toward the first surface, has a diameter smaller than that of the pressurizing chamber body, and connects the pressurizing chamber body to the ejection port, and the first channel member comprises:

a plurality of first individual channels extending from the third channel to the plurality of pressurizing chamber bodies, and a plurality of second individual channels extending from the plurality of partial channels to the fourth channel.

4. The liquid ejection head according to claim 3, wherein each of the plurality of first individual channels opens on a surface of the pressurizing chamber body, the surface being on a side of the first surface, and each of the plurality of second individual channels opens on a side surface of the partial channel.

5. The liquid ejection head according to claim 1, wherein the first channel member comprises a plurality of first individual channels extending from the third channel to the plurality of pressurizing chambers, and each of the plurality of first individual channels comprises a section with a smaller cross-sectional area than a cross-sectional area of a section extending from the third channel and a cross-sectional area of a section extending from the pressurizing chamber, at an intermediate position.

6. The liquid ejection head according to claim 1, wherein the first channel member comprises a plurality of second individual channels extending from the plurality of pressurizing chambers to the fourth channel, and each of the plurality of second individual channels comprises a section with a smaller cross-sectional area than a cross-sectional area of a section extending from the fourth channel, at an intermediate position.

7. The liquid ejection head according to claim 1, wherein the first channel member comprises:

a plurality of the third channels extending parallel to each other in a planar perspective of the second surface, and a plurality of openings that open on the second surface and communicate with the plurality of third channels, and the second channel member comprises:

a third surface overlapping with the second surface, and a groove on the third surface, extending along the plurality of openings.

8. The liquid ejection head according to claim 1, further comprising:

a pressurizing member, wherein the second channel member comprises a recess on a side of the first channel member, and the pressurizing member is located within the recess.

9. The liquid ejection head according to claim 8, wherein, in a planar perspective of the second surface, the pressurizing member and the recess extend across the plurality of pressurizing chambers.

10. The liquid ejection head according to claim 9, wherein, in the planar perspective of the second surface, the pressurizing member and the recess extend across two or more pressurizing chambers arranged in a first direction and two or more pressurizing chambers arranged in a second direction intersecting the first direction.

11. The liquid ejection head according to claim 8, wherein the second channel member comprises a raised part on a fourth surface opposite to the first channel member, which overlaps with an entirety of the recess in a planar perspective of the fourth surface.

12. The liquid ejection head according to claim 1, wherein the second channel member comprises:

a through hole in communication with the third channel through the first channel, and a through hole in communication with the fourth channel through the second channel.

13. The liquid ejection head according to claim 1, wherein the first channel, the third channel, the plurality of pressurizing chambers, the fourth channel, and the second channel are configured to form a circulation channel that sequentially passes through them by connecting an endpoint of the second channel to a starting point of the first channel.

14. The liquid ejection head according to claim 1, wherein the second channel member is injection molded.

15. A liquid ejection head comprising:

a first channel member comprising:

a first surface, a plurality of ejection ports in the first surface, a second surface opposite to the first surface, a third channel, a plurality of pressurizing chambers in communication with the third channel and with the plurality of ejection ports respectively, and a fourth channel; and a second channel member on the second surface, containing resin, and comprising:

a first channel in communication with the third channel and in contact with the resin, and a second channel in communication with the third channel through the fourth channel.

16. A recording device comprising:

the liquid ejection head according to claim 1, a conveying part which conveys a recording medium with respect to the liquid ejection head, and a control part which controls the liquid ejection head.

* * * * *